US007426730B2

(12) United States Patent
Mathews et al.

(10) Patent No.: US 7,426,730 B2
(45) Date of Patent: Sep. 16, 2008

(54) METHOD AND SYSTEM FOR GENERALIZED AND ADAPTIVE TRANSACTION PROCESSING BETWEEN UNIFORM INFORMATION SERVICES AND APPLICATIONS

(75) Inventors: Michael B. Mathews, Kirkland, WA (US); Mark J. Seilstad, Kent, WA (US); Steven J. Gregory, Seattle, WA (US); Charles M. Zalinski, Redmond, WA (US)

(73) Assignee: WRE-HOL LLC, Kirkland, WA (US)

( * ) Notice: Subject to any disclaimer, the term of this patent is extended or adjusted under 35 U.S.C. 154(b) by 502 days.

(21) Appl. No.: 10/125,794

(22) Filed: Apr. 18, 2002

(65) Prior Publication Data

US 2003/0061256 A1 Mar. 27, 2003

Related U.S. Application Data

(60) Provisional application No. 60/285,402, filed on Apr. 19, 2001.

(51) Int. Cl.
*G06F 9/46* (2006.01)
*G06F 15/16* (2006.01)

(52) U.S. Cl. ....................... 718/104; 718/102; 709/201; 709/202

(58) Field of Classification Search ......... 718/100–104; 709/200–203
See application file for complete search history.

(56) References Cited

U.S. PATENT DOCUMENTS

| | | | | | |
|---|---|---|---|---|---|
| 5,432,926 | A | * | 7/1995 | Citron et al. | 714/4 |
| 5,546,541 | A | * | 8/1996 | Drew et al. | 709/240 |
| 5,561,797 | A | * | 10/1996 | Gilles et al. | 707/8 |
| 5,644,720 | A | * | 7/1997 | Boll et al. | 709/227 |
| 5,768,587 | A | * | 6/1998 | Freund et al. | 718/101 |
| 5,838,918 | A | * | 11/1998 | Prager et al. | 709/221 |
| 5,864,679 | A | * | 1/1999 | Kanai et al. | 709/238 |
| 5,956,715 | A | | 9/1999 | Glasser et al. | |
| 5,958,004 | A | | 9/1999 | Helland et al. | |
| 6,039,245 | A | * | 3/2000 | Symonds et al. | 235/379 |
| 6,058,267 | A | * | 5/2000 | Kanai et al. | 712/28 |
| 6,081,893 | A | | 6/2000 | Grawrock et al. | |
| 6,101,527 | A | * | 8/2000 | Lejeune et al. | 709/201 |
| 6,151,637 | A | * | 11/2000 | Phillips et al. | 709/201 |
| 6,157,927 | A | * | 12/2000 | Schaefer et al. | 707/103 R |
| 6,182,142 | B1 | | 1/2001 | Win et al. | |
| 6,302,326 | B1 | * | 10/2001 | Symonds et al. | 235/379 |
| 6,496,865 | B1 | | 12/2002 | Sumsion et al. | |
| 6,714,945 | B1 | * | 3/2004 | Foote et al. | 707/104.1 |
| 6,738,971 | B2 | * | 5/2004 | Chandrasekaran et al. | 718/100 |
| 6,813,636 | B1 | * | 11/2004 | Bean et al. | 709/226 |
| 6,912,522 | B2 | * | 6/2005 | Edgar | 707/2 |

(Continued)

*Primary Examiner*—Meng-Ai An
*Assistant Examiner*—Jennifer N To
(74) *Attorney, Agent, or Firm*—Christensen O'Connor Johnson Kindness PLLC

(57) ABSTRACT

The system and methods of the present invention provide a processing function that is useful for controlling any type of transaction between providers and consumers of information services. The invention provides a transaction framework that dynamically integrates a plurality of service providers and consumers based on transaction context data. Transactions between services are described using a transaction definition. A transaction definition specifies the details of the transaction using a uniform specification model, where services are classified through a standardized taxonomic structure. The processing function analyzes service classification during a transaction to determine the appropriate configuration and processing strategy.

42 Claims, 23 Drawing Sheets

U.S. PATENT DOCUMENTS 6,971,096 B1 * 11/2005 Ankireddipally et al. .... 718/101
7,167,924 B1 * 1/2007 Symonds et al. ............ 709/246
2001/0014907 A1 * 8/2001 Brebner ...................... 709/202

* cited by examiner

```
1101  <td:TD XMlns: td= 'TPF.Types.TransactionDefinition'
       tdKey    = 'global.transactions.MapPoisInProximity'
       tdName   = 'MapPoisInProximity'
       scopeKey = 'global' >

1102   <argument name='resourceClass' typeId='URI'     source='external' bOptional = 'false'/>
       <argument name='searchString'  typeId='string'  source='external' bOptional = 'true' />
       <argument name= 'tx'           typeId='TPF.Transaction' source='internal' />
       <context  name='location'      typeId='TPF.Contexts.Location'/>

1103   <result   name='map'      typeId='GIS.map' />

       <body  formatKey='ASCII'  languageKey='jscript'>

1104    //Build Arguments list to search services that support
        //searching. Specify resource type, searchString, location, and search radius.
        Arguments   args; //name, type, value
        args.AddElement( 'ResourceClass',  'URI',          resourceClass );
        args.AddElement( 'searchString',   'string',       searchString);
        args.AddElement( 'location',       'TPF.location',  location.xml() );
        args.AddElement( 'radius',         'long',          '10,000');

        URDSet results = tx.Execute( 'ProximitySearchApi', 'FindNearby', args );

1105    // Map results if any.
        // otherwise return emptyset.
        URDSet Map;
        if( results.Count() > 0 ) {
           Map = tx.Map( results, location, 'gif-800x600' );
        }

1106    return Map;
       </body>
      </td:TD>
```

Figure 11

METHOD AND SYSTEM FOR GENERALIZED AND ADAPTIVE TRANSACTION PROCESSING BETWEEN UNIFORM INFORMATION SERVICES AND APPLICATIONS

CROSS REFERENCE TO RELATED APPLICATION

This application claims the benefit of prior U.S. Provisional Application No. 60/285,402, filed Apr. 19, 2001, the subject matter of which is incorporated herein by reference.

FIELD OF THE INVENTION

This invention relates to transaction processing and more particularly to the processing of transactions between providers and consumers of information services.

BACKGROUND OF THE INVENTION

The arrival of Internet has altered the fundamental means for creating, managing, and communicating information. E-mail, instant messaging, and personalized content have become the mainstays in both consumer and commercial environments. With the advances in wireless communications, it will soon be possible to deliver large amounts of information with relative ease almost anywhere. The promise of this technology convergence is mobility without lost of connectivity and productivity; individuals are no longer tied to their desktop workstations to stay abreast of their 'e-life'. However, with all these devices and means to get at information, little has been done to improve information access and integration. With the world-wide-web, information is often loosely integrated with links or delivered as independent content applications; the user navigates the web using links to content determining the relevance to his/her situation as they go. Though we are advancing slowly with techniques of personalization and customization we have yet to provide a comprehensive means to simply access the right information when and where we need it.

At an increasing rate, more and more information is being made available 'on-line', whether publicly through portals and other web sites or via secured access to corporate intranets. On-line access means users can quickly get at information from any networked device as long as it supports the appropriate application protocols. Most of this information is accessible through some pre-defined interface, which allows users to interact with the information in a controlled fashion: including functions for security, utilization, billing, etc. To date, most of these information services provide their information in a customized and non-standard form, requiring specialized applications (including web pages) software to work with it. Though the information may have value in its 'raw' form, the potential value for integrating disparate information services has many more benefits.

Corporate intranets and Internet portal providers have made the first attempt at integrating this information by aggregating content into a seamless user interface. From the user perspective, the information can be accessed from a single point, with relative simplicity. However, this approach has limited value, as related information that has meaningful associative value is presented independently. Consider the case of many of today's Internet portals that provide maps and driving directions as well as current traffic conditions. The user has easy access to both information content, but cannot work with both types of information together. However, it would be more useful if this information were presented together such that driving directions included and adapted to current traffic conditions, such that the system can provide users with driving directions that avoid traffic congestion or incidents.

Currently, information integration relies on customized software that explicitly integrates two or more information sources providing additional functionality or information. Though efficient in terms of solving the immediate integration problem, the approach is less than satisfactory when one realizes that the particulars of integration are essentially a template that can be re-applied to many information sources as long as the type of information and service access model is compatible. Thus, custom solutions are limited to a particular implementation or problem. For example, Internet portals have taken great pains to integrate personal information into their solutions, providing a custom experience for the user. Personal information includes contacts, schedules, e-mail lists, and personal preferences. To provide a homogenous solution to its user base, most portals provide the infrastructure to manage the personal data; however, it forces many users who use the portal services to maintain multiple copies of their personal data—particularly if they are a working professional that has access to a corporate intranet. This produces an inefficient situation, where information must be entered and updated, by hand in most cases, in multiple places.

This problem of how a consumer portal, for millions of consumers, could successfully integrate personal information that is remotely managed by potentially thousands of different information sources is one of the impetuses for the present invention. There is a need for a solution that provides a means to couple information services at a user, or session, level without explicit reference to that information provider as the integration may change from transaction to transaction.

Fortunately, this problem of information integration has been greatly aided by the introduction of XML (eXtensible Markup Language), SOAP (Simple Open Access Protocol), standardized information typing (or schemas in XML parlance), and registration through organizations including: bistalk.org and schema.net. Though not a total solution, these technologies and organizations are defining a common interaction protocol and languages standards that are making it easier for information services to interchange information. Other standards such as Electronic Data Interchange (EDI) have also paved the way in enabling standardized or uniform information exchange. With these standard integration protocols, information services have a common means to interact. In addition, services directories such as UDDI ("Universal Description, Discovery, and Integration") have provided the means to standardize descriptions of services as well as provide a means for discovery. More work is still required to simplify the task of integration and management of service transactions at a large scale, where configurations may differ between sessions or even between transactions.

Distributed transaction management technology has been a mainstay with large-scale database systems, where data is spread out across disparate systems. In these systems, a transaction is typically conducted with one or more information bases that remain in a relatively fixed configuration with respect to the system's lifecycle. Database transaction technologies have some of the basic patterns found in a more generalized approach. Typically, distributed database transactions are made with atomic information elements that are database compatible. In terms of a generalized transaction solution, the model breaks down when the element of the transaction is more than just information. In a generalized solution, transactions need to support any type of transaction, be a programmatic event, signal, or information exchange; and to provide a framework for extension to new types.

The primary problem is providing an efficient, generalized and scalable transaction framework that can implicitly integrate services without requiring extensive custom development, particularly where large numbers of similar services are in use. A useful solution to this problem would alleviate service integrators or application developers from managing the ever-increasing complexities of configuration management and point-by-point integration. As the system size grows large in terms of flexibility requirements, user-personalization, supported services, and operating capacity, a means to define the general operating rules and relationships independent of physical configuration becomes increasingly important. There is a need to automate the management of the rules, relationships, and process flow instead of the actual configuration and integration points as the shear number becomes humanly unmanageable. A method and system providing such a solution would be a useful and novel invention over prior art.

Another problem for generalized transaction processing is to provide a means to adjust transaction processing based on 'environmental' conditions. Many system implementations today tout features including 'personalization' and location-based processing, often indicating that system functions take into account user-preferences and current position while processing a specific request for information. More generally, personal preferences and current location are specific types of contextual information that is available to the system at the time of transaction processing. These data are special in that the system actively manages this information as part of its session state, making it available to any function (or transaction) that might require this knowledge.

In the future, contextual information will become even more important in terms of limiting, controlling, or processing information flow between sources and consumers. The availability of information will greatly out pace the ability to digest or interpret unless some filtering mechanism is applied that limits the data according to specific rules, including the applicability to the current situation. The problem is how to generalize situational context such that it can be suitably applied in a generalized transaction framework. Given that required set of context information will change depending on the application environment and user-situation, there is a need to create a solution that can allow the transaction framework to support any type of contextual information in an extensible fashion. A useful solution should also support existing context type information such as personal preferences and location.

SUMMARY OF TERMS

To provide a foundation for the following discussion of the invention it is useful to define certain basic terms.

"Configuration" means an atomic set of information that defines a deployment and operating environment for one or more TPFs (Transaction Processing Function). A TPF's configuration is static and unchanging during a transaction. A configuration may change between transactions according to some external configuration management function.

"Context" means a quantifiable and describable element of information that is related to the nature of resources manipulated by RSCs (Resource Service Consumer) and RSPs (Resource Service Provider). Context information is used in the scope of a transaction to constrain or facilitate the processing.

"Domain" is a group of members that share the same privileges.

"Member" is a single individual or a group that is comprised of one or more individuals.

"Object" means a software program or function that has well defined interfaces, state, and behavior that can be explicitly identified within some system. Objects can contain objects.

"Operation" means a specific interaction between two or more objects.

"RSC" means Resource Service Consumer. An RSC interacts with a TPF for the purposes of consuming or manipulating resources provided by one or more RSPs. An RSC will typically initiate the majority of the transactions with a TPF. An entity may be an RSC and RSP simultaneously; the present invention does not constrain the specific implementation.

"RSP" means Resource Service Provider. An RSP provides access to resources in a means compliant with the present invention.

"Resource" means any information or function that can be well defined with quantifiable structure, attribution, behavior, and interfaces. The present invention requires that resources managed as part of a transaction be describable and discrete in nature such that they can be represented by a standardized description. Examples of resources include the following: text messages, XML and HTML documents, images, collections, functional interfaces, and services (quantified function sets).

"Service" means an entity that has a quantifiable and describable function with respect to resources it supports. A TPF interacts with services during the processing of transactions in order to accomplish the requested manipulation of resources. Services may support multiple types of resources as defined by the description of the service.

"Session" is a set of related transactions. In the present invention, sessions define the boundary conditions for a series of transactions. A Session includes common information used by one or more transactions.

"TD" means transaction definition. A TD is a quantifiable set of information that defines a transaction to be performed with a system of TPFs and one or more RSPs and RSCs. A TD specifies the nature of the transaction, processing instructions, required conditions, and expected results.

"TPF" means Transaction Processing Function. A TPF is a software component that manages transactions between one or more information services as provided by the present invention.

"Transaction" is initiated by a request from a client. In the course of processing the transaction request, one or more operations may be spawned to service the request. In this way, these operations are related since they are servicing the same transaction request. These operations may utilize the resources provided by one or more information or application services as needed.

"TSC" means Transaction Situation Context. A fixed set of contexts that describe the current state of the processing environment with respect to the session, RSCs and RSPs during a particular transaction. A TSC exists in a one to one relationship with a transaction and is contained within the lifecycle of the transaction.

"URD" means Uniform Resource Descriptor, which provides a means to reference a resource and to manipulate a resource without explicitly managing the resource. Services provide URDs as handles or pointers to resources, which can be de-referenced as needed to get the actual resource.

"USM" means Uniform Specification Model, which defines the objects and relationships describing the type information used by the TPF. The TPF understands the objects and relationships defined by the USM.

"USR" means Uniform Specification Repository, which provides a means to store and access information in a format consistent with the USM. The TPF accesses information stored in the USR.

SUMMARY OF THE INVENTION

The system and methods of the present invention provide a processing function that is useful for controlling any type of transaction between providers and consumers of information services. In particular, the invention provides a transaction framework that dynamically integrates a plurality of service providers and consumers based on transaction context data. Transactions between service consumers and providers are conducted according to a generalized description. Termed a transaction definition (TD), these descriptions specify the details of the transaction using a Uniform Specification Model (USM), which provides the means to define the transaction without explicit reference to particular services. These TDs are processed by the system of the present invention and are applied to a specific configuration of service providers and consumers at the time of transaction.

In accordance with the present invention, one or more Transaction Processing Functions (TPFs) are deployed and configured through servers networked together to form a system. One or more TPFs are hosted on each server in the system. Each server is typically connected to one or more servers in a local area network, which is further connected to some wide area network such as the Internet. Within this network of servers, one or more services are connected to the system of TPFs forming a distributed processing framework that allows any service to conduct transactions with any other bound service in accordance with the access privileges and transaction definitions as managed by the TPF. Multiple TPFs coordinate transaction processing according to the configuration and transaction context. An aspect of the present invention provides for TPFs to adjust processing according to current server loading and service bindings.

Services, information content, and related contextual information are defined and classified according to a standard taxonomic structure that is represented via a Uniform Specification Model. Any service with sufficient access rights can create/register new specifications for services, information content or contextual information through an exposed Application Programming Interface (API). These classified specifications are stored in a Uniform Specification Repository (USR) for efficient access by one more TPFs. According to the present invention, specifications are related to other specifications according to the classification and attributes as provided by a Uniform Specification Model (USM). These specifications define the rules, constraints, and allowable relations. The TPF analyzes specification information to determine suitability and compatibility of services during the scope of the transaction. In the nomenclature of the present invention, services provide or consume information content, which is more generally defined as a resource. Resources may represent anything including information content, metadata, or references to resources as long as it can be quantitatively described in accordance with the USM.

In another aspect of the invention, TDs provide a generalized way of describing the interaction between services. The exact TD specification is defined by some external TD processing agent that integrates with a TPF through an exposed application programming interface. The processing agent analyzes and executes a TD in accordance with the TPFs transaction process flow. The TPF can support multiple processing agents, allowing services a way to conduct transactions with the TPF using a TD format that is most appropriate for them: illustrative formats include XML, SOAP, and JScript. Further, TDs can be registered (via an exposes API) and reused or referenced by other TDs. This capability provides for easy reuse as well as performance enhancement since once a TD is registered it no longer needs to be recompiled.

In yet another aspect of the invention, TPFs conduct transactions within the scope of a session. A session maintains information about a related set of transactions. One or more elements of the session information are made available to a particular transaction through a transaction situation context (TSC). The TSC provides information required by the TD that is not explicitly provided by the initiating service. This allows TPF transactions to adapt processing based on session information as provided by the TSC. The provision of generalized contextual processing alleviates the need for services to manage the potentially useful information directly.

TDs are processed by a TPF in a series of sequential operations that produce intermediate data objects, which may be cached between transactions for the purposes of optimization. The TPF begins processing a TD by determining the types of service operations, contexts, and resources required to produce a fully formed, executable transaction. The TPF builds the TSC using session state information according to the TD. Following, the types of service operations are broken down into explicit service operations, which are specific to session scope. Continuing, the TPF assigns the resultant service operations to a particular TPF/service binding according to some cost and configuration function. Once the transaction has been defined explicitly, with bindings to particular services, the transaction is executed and the results or error conditions are returned to the initiator. In cases where the same operation is executed with multiple services of the same type, the results are combined to form an aggregate result set. The present invention provides optimization of one or more aspects of the processing sequence such that TPF processing has minimum performance impact.

In another aspect of the invention, transactions can either be synchronous or asynchronous. The service initiating the transaction request specifies (via the TD) whether the transaction is synchronous or asynchronous. For synchronous transaction requests, the initiating service must wait until the transaction has been processed to get a response back from the TPF. For asynchronous transaction requests, a response is sent back immediately to the initiating service. Asynchronous transactions are useful in situations where a service wants to send and not receive information to/from the TPF such as updating the location of a vehicle or turning on and off traffic alerts.

According to a further aspect of the invention, the TPF structural processing model is extended to support domain and member information, enabling the processing model to natively support inter-session state information. Through this mechanism, contextual information is further enhanced by inclusion of member state data and domain state data. In the illustrative case of personal preferences, the member extension provides a way to establish preference relationships that persist between sessions, and to provide additional context classifications analyzed by the TPF. Further, the domain extensions provide a mechanism to control processing according to an externally assigned scope operation, in that member sessions can be limited in scope according to the specified domain attributes. The TPF uses these extensions to enforce transaction compliance and security across related sessions as well as to provide the framework for a richer base of context information.

Reference to the remaining portions of the specification, including drawings and claims, will realize other features and advantages of the present invention. Further features and advantages of the present invention, as well as the structure and operation of the various embodiments of the present invention, are described in detail below with respect to the accompanying drawings.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

All drawings are depicted using syntax and grammatical structures of the Unified Modeling Language (UML, version 1.1); where appropriate or necessary additional diagrammatic constructs have been used to disclose the nature and preferred embodiment of the present invention.

FIG. 11 is an illustrative example of a TD defined using a combination of XML and JScript. The example TD defines a transaction, for generating a map of the specified class of resources near the location (provided by the TSC) matching the search string.

DETAILED DESCRIPTION OF THE PREFERRED EMBODIMENT

Figure 1:
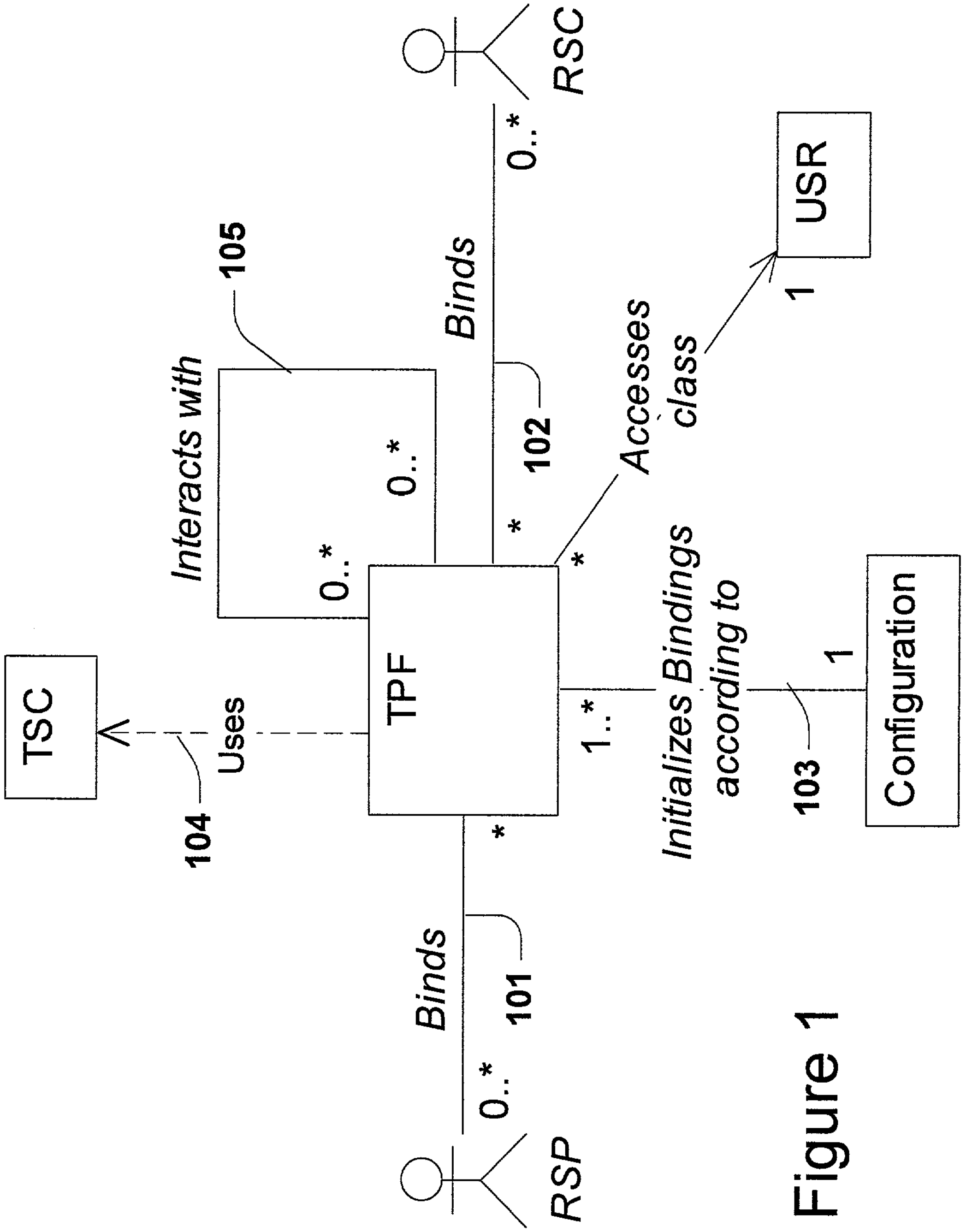
FIG. 1 shows a logical object relationship model of the present invention describing the primary relationships between multiple TPFs, RSCs, and RSPs. The model defines the domain of possible relationships between the major components of the system.

The present invention provides for information transaction processing between multiple service providers and consumers without explicit coupling between providers and consumers prior to execution of the transaction. According to the present invention, the interaction between information and service providers and consumers is managed by one or more transaction processing functions (TPF) so that access to services and information by consumers is controlled. Access to and coordinated delivery of information and services can be managed in a standardized and uniform manner such that the same set of TPFs can simultaneously support multiple types of information and service transactions.

In the present invention, networked services providing or consuming information are classified according to a uniform service model (USM), where the service and information they provide can be quantitatively described as to function, type of information, access model using a standardized taxonomic structure. With this classification, the present invention provides a method and system for allowing such classified services to conduct transactions with other services without explicitly identifying the source or targets of the transaction. Services qualified as Resource Service Consumer (RSC) submit transaction definitions (TDs) to a TPF (or system of TPFs as provided by a particular configuration) in the context of a session, where upon the TPF analyzes the TD in order to determine the set of services to use and additional information that is required prior to execution. Once the TD services are selected and associated transaction situation context (TSC) defined, the TPF executes the transaction either synchronously or asynchronously as defined by the TD. During transaction processing, the TPF may execute multiple operations with resource service providers (RSP) combining the results of the operations as needed. The results of these operations are resources, which may be information content or descriptions of information or services thereof.

The system of the present invention is a scalable, distributed, and generalized transaction framework that supports a plurality of service and resource classes using the same processing infrastructure. Through this framework, services are loosely coupled according to their class specification, which describe the functions and resources they support. These specifications are stored in a repository that is accessed by the one or more TPFs during transaction processing in order to determine service compatibility with the TD. Further, the framework provides a means to differentiate available services on a session-by-session basis, allowing access models to be controlled by some configuration means.

The system can operate in a variety of configurations using a one or more TPFs providing a flexible means to balance server loading. Through the configuration mechanism, the transaction framework natively supports transaction distribution such that TPFs coordinate transaction processing as specified by service bindings. From an RSP or RSC perspective, a system of one or more TPFs appears as one TPF.

The method of the present invention is a process for conducting transactions using the TPF system without explicitly interpreting or interacting with the resource information. The method provides a means to specify TDs such that they can be processed and stored for subsequent reference using a uniform resource indicator (URI). Further, the method provides a means to process TDs using an external processing agent, which translates TDs into a structured format readily processable by a TPF. The external processing agent provides a means to support multiple TD schemas as required by the particular deployment. In addition, the TD processing method also provides for a means to select compatible services and then to execute the transaction as defined by the TD. With TPFs providing dynamic transaction control, the present invention provides methods for improving TPF transaction performance, as well as means for scaling TPF functionality to provide maximal transaction throughput with a minimum of computing overhead.

To support easy integration and rapid applications development, registered TDs can reference other TDs using a URI, creating a functional programmatic model, where services can leverage pre-defined transactions through any number of distributing computing protocols including SOAP, RMI, CORBA, COM+. In addition, these stored TDs can be grouped to form an Application Programming Interface (API).

The present invention provides an additional means for transaction control and service binding using membership and operating domain classification. Through these additional classification mechanisms, the TPF system can be configured to automatically support different service profiles with different API definitions in a secured manner.

In the present invention, one or more TPFs share a common configuration and means for coordinating transaction processing between TPFs. The TPFs are hosted by one or more processing host servers, which provide some means for inter-server networking. The TPFs are configured with bindings to one or more RSPs and/or RSCs. Bindings can be established at any time according to a configuration management function and are available for transaction processing once established. RSCs can gain access to the information and services provided by one or more RSPs by submitting transaction definitions (TD) to a TPF. The TPF analyzes the TD and determines which RSPs should be utilized in execution of the TD.

FIG. 1 shows a logical model of the core elements and their relationships. All deployment configurations envisioned in the present invention are logically described by the drawing. Zero or more RSPs 101 bind with one or more TPFs. Similarly, zero or more RSCs 102 bind with one or more TPFs. The specific bindings of RSCs and RSPs are defined by a single configuration 103 which may be used by one or more TPFs. For each transaction executed by a TPF, an instance of a TSC 104 is used to control the processing behavior. TPFs 105 can interact with each other according to the specified configuration 103 in order to execute a particular transaction. This allows RSPs 101 or RSCs 102 to be assigned to particular TPFs and the transactions distributed accordingly. In the present invention, the means for interactions of the TPFs 105 and bindings 101 and 102 are accomplished using one or more standardized means for distributing computing. Standards including CORBA, SOAP, Java RMI, and Microsoft COM+ are examples of standardized software integration supported by the preferred embodiment of the present invention.

Figure 1A:
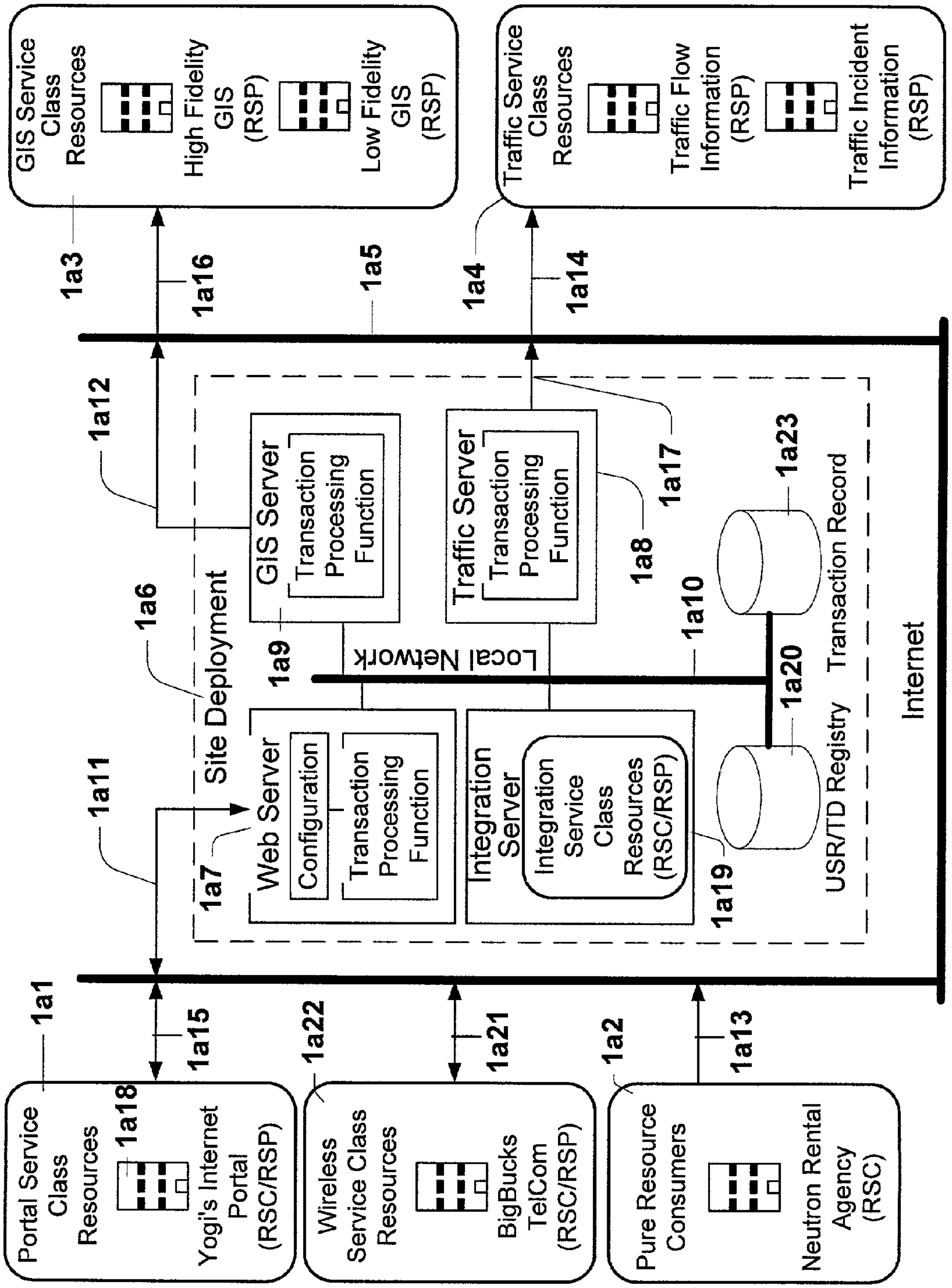
FIG. 1*a* shows an example configuration of the preferred embodiment as it could be used to realize a system in the real world.

FIG. 1*a* shows an example usage scenario of the preferred embodiment that exposes a series of applications and services targeted at the wireless application market. This example should assist in the understanding of the descriptions provided in this document for the present invention.

For this example, there are five classes of resource providers; Portal Services 1*a*1, GIS Services 1*a*3, Traffic Services 1*a*4, Integration Services 1*a*19, and Wireless Services 1*a*22. The portal service provider class 1*a*1 contains a single provider 1*a*18, which is also a resource consumer in this example. The portal service provider 1*a*18 provides standard portal content such as news, weather and stocks. The GIS service provider class 1*a*3 contains two GIS service providers, one providing high fidelity GIS information (maps, routes, etc.) and one providing low fidelity information but cheaper. The traffic service provider class 1*a*4 contains two traffic service providers, one that provides traffic flow information and one that provides traffic incident information. The integration service provider class 1*a*19 contains a single provider, which is also a resource consumer in this example. The integration service provider 1*a*19 provides content integration services for the solution. The wireless service provider class 1*a*22 contains a single provider, which is also a resource consumer in this example.

There are four resource consumers in this example, the Pure Resource Consumers 1*a*2, the Portal Service Class Resources 1*a*18, the Integration Services Class Resources 1*a*19, and the Wireless Service Class Resources 1*a*22. The pure resource consumers 1*a*2 only consume information and do not act to provide information in any way. One example of a pure resource consumer 1*a*2 is provided, a rental company (Neutron Rental Agency). The Neutron Rental Agency tracks the location of all their rental equipment. To do this, they subscribe to the tracking application provided by the BigBucks TelCom service. The portal service consumers 1*a*1, utilize the GIS mapping and traffic incident information to provide richer content to their customers. The integration service consumers 1*a*19 work with all of the other service providers to integrate information such as integrating maps, routes, and traffic. The wireless service consumers 1*a*22 use the portal, GIS, traffic, and integration services to provide a tracking application and a mobile organizer application to their subscribers.

All of the external service providers and consumers 1*a*1, 1*a*2, 1*a*3, 1*a*4, and 1*a*22 are connected to the Site Deployment 1*a*6 via the Internet 1*a*15, 1*a*13, 1*a*16, 1*a*21, and 1*a*14.

The Site Deployment 1*a*6 consists of a collection of servers, one Web Server 1*a*7, one GIS Server 1*a*9, one Traffic Server 1*a*8, and one Integration Server 1*a*19 that are all connected via a local network 1*a*10. In addition, a data store 1*a*20 is present to manage the supported class specifications and registered transaction definitions. A transaction record store 1*a*23 is also present to maintain a record of all transactions processed for billing purposes. The Web Server 1*a*7, GIS Server 1*a*9, and Traffic Server 1*a*8 all contain a single Transaction Processing Function and are collectively configured via the Configuration contained on the Web Server 1*a*7. For this particular configuration, all GIS operations are delegated to the TPF on the GIS Server 1*a*9 and all Traffic operations are delegated to the TPF on the Traffic Server 1*a*8. This is done to reduce loading on the Web Server 1*a*7. Integration operations are processed by the TPF on the Web Server 1*a*7 in conjunction with the Integration Server 1*a*19 acting as a resource provider.

Prior to interacting with the site 1*a*6, a service class must be registered for each provider service utilized by the system and each consumer service using the system. An administrator of the system usually registers the service class since a portion of the service classification specifies the access rights for the service. In addition, service providers must register their supported resource classes and resources for use by the system. Service consumers have the option to register some of their more commonly used transaction definitions. This will improve runtime performance. However, it is also acceptable to create the transaction definitions at runtime. Any non-standard context classes must be registered before they are referenced. Non-standard context classes are those that are not pre-configured (independent of any service) into the system and generally available to all services. If a consumer is specifying their transaction definitions in a non-standard specification language, that consumer must register a processing agent that supports the transaction definition language and processes it into operational sequences as specified in the present invention. For this example, all consumers are using a standard transaction definition specification syntax based on XML and JScript, which is supported by the site 1*a*6.

The following is a breakdown of the class specifications and transaction definitions registered for this example.

1. There are no standard transaction definitions or context definitions. There are eight registered service classes, one for each of the providers and consumers interacting with the system (High Fidelity GIS, Low Fidelity GIS, Traffic Flow Information, Traffic Incident Information, Integration Services, Yogi's Internet Portal, BigBucks TelCom, and Neutron Rental Agency).
2. Each of the service providers registers their supported resource classes and resources. High Fidelity GIS registers high quality mapping, routing and geocoding resources in the GIS resource class. Low Fidelity GIS registers lower quality mapping, routing and geocoding resources (but cheaper) in the GIS resource class. Traffic Flow Information registers a traffic flow resource in a Traffic resource class. Traffic Incident Information registers a traffic incident resource in a Traffic resource class. Integration Services registers a mapping integration resource in an Integration resource class. Yogi's Internet Portal registers news, weather and stocks resources in a Portal resource class. BigBucks TelCom registers a tracking application and a mobile organizer application resource in a Wireless Services resource class.
3. Since BigBucks TelCom uses location and personalization in its applications, they registered new context classes for location and personalization. The location context (in this case) manages the current location for a group of items that could be devices, users, etc . . . . BigBucks also decided to improve performance by registering a transaction definition (for use by its subscribers) for mapping the current location of a user along with traffic incidents in the area.

Although there are many possibilities for runtime scenarios, the one discussed here is the one that touches most facets of the provided example. The scenario is as follows. The Neutron Rental Agency subscribes to the BigBucks TelCom tracking application resource so they can track the location of their equipment.

Each piece of rental equipment that is tracked has a device built into it that sends asynchronous transaction requests (in the form of a transaction definition) to the Web Server 1*a*7 on the site 1*a*6, containing the current location context of the equipment. At any given time, the Neutron Rental Agency representatives can determine the location of any of their equipment by accessing the tracking application on the Internet (provided as part of the subscription to the BigBucks TelCom service provider). The tracking application provided by BigBucks TelCom uses the Low Fidelity GIS resource (located in the GIS resource class) and the mapping integration resource (located in the Integration resource class). In addition, to find the location of each piece of equipment, the location context is used.

The tracking application works by sending a transaction request (in the form of a transaction definition) to the Web Server 1*a*7 at the site 1*a*6. The transaction definition specifies that a map is to be generated that encompasses the locations of all items in the location context. In addition, the transaction definition specifies that icons be overlaid on the map to show the location of all items in the location context. The transaction definition further specifies that the response contain the generated map with the overlaid icons and the current location context.

The TPF on the Web Server 1*a*7 processes the transaction definition by breaking it down into discrete operations. The map generation operation is delegated to the TPF on the GIS Server 1*a*9, which uses the Low Fidelity GIS resource to generate the map. The mapping integration resource is then used on the Integration Server 1*a*19 to overlay icons on the map for the locations of all items in the location context. The Web Server 1*a*7 returns the generated map (with the overlaid icons) and the current location context to BigBucks TelCom. BigBucks TelCom generates an HTML page with the map and adds hot points to it for each of the devices identified in the location context. Finally, the HTML page is returned to the Neutron Rental Agency representative (via the Internet).

Since the Transaction Record 1*a*23 includes the resources used as well as the resource consumer, billing is a relatively simple process of collecting the resources used by each consumer and billing appropriately.

In the future, adding more GIS Servers, Traffic Servers, or Integration Servers can scale the site 1*a*6. In accordance with the configuration settings on the Web Server 1*a*7, the TPF on the Web Server will dynamically delegate operations (to the GIS Servers, Integration Servers and Traffic Servers) based partly on the current server loading.

More consumers can easily be supported by the site 1*a*6 by registering a service class for them and adding whatever new resources are required for their transactions.

In addition, more providers of the same resource class can be added to provide redundancy, more choices and different price levels for a particular resource. The TPF will choose the resource most appropriate for the operation at hand without the consumer having to deal with the details.

Figure 2:
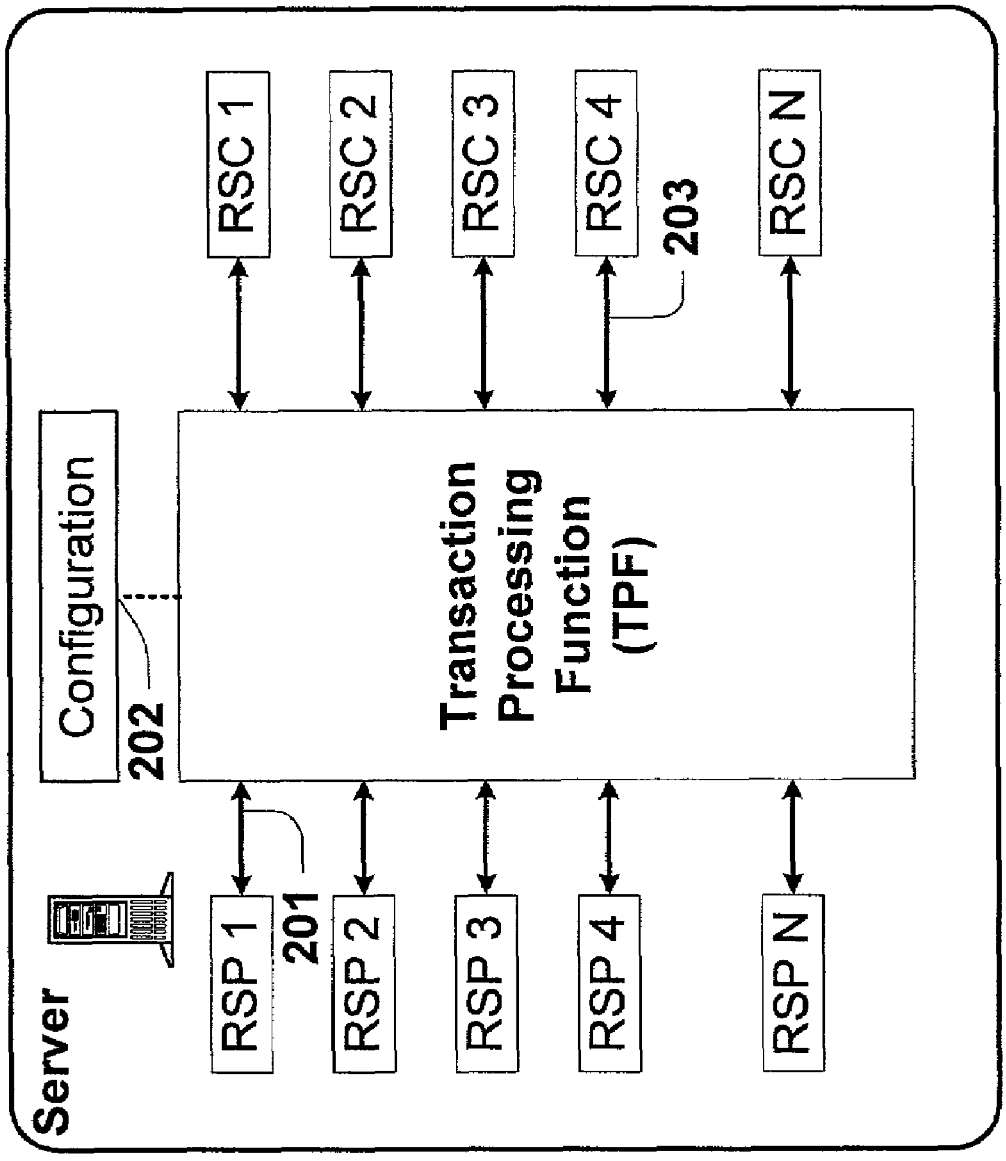
FIGS. 2 to 4 show illustrative system configuration block diagrams useful for processing and distributing resource transactions between a plurality of RSPs and RSC supported by one or more host servers.

FIG. 2 shows an illustrative collaboration of a plurality of RSPs and RSCs with a single TPF. In this configuration, all software elements reside on the same server. RSC N denotes the 'nth' RSC, where n is used to describe an unspecified multiple of RSCs. TPFs, within the limits of server capability, can support a very large number of bindings with RSPs and RSCs. Each RSP, such as RSP 1, bind with the TPF 201 according to the specified configuration 202. In this configuration, any RSC can transact with any of the RSPs. The TPF intercedes on behalf of both the RSC and RSPs to determine how to best process the transaction. During the course of a transaction, the TPF may execute operations with one or more RSPs. This configuration is useful in the present invention to provide the means to develop RSCs without explicit knowledge of the resources that provide it.

As provided by distributed computing standards, the present invention treats each type of binding configuration essentially the same as any other type, providing a very flexible means for integration. The exact binding configuration of RSCs, RSPs, and TPFs is dependent upon constraints and performance issues of the particular environment. The objective of the present invention is to provide a flexible architecture that can be adjusted to support a wide variety of configuration options.

Figure 3:
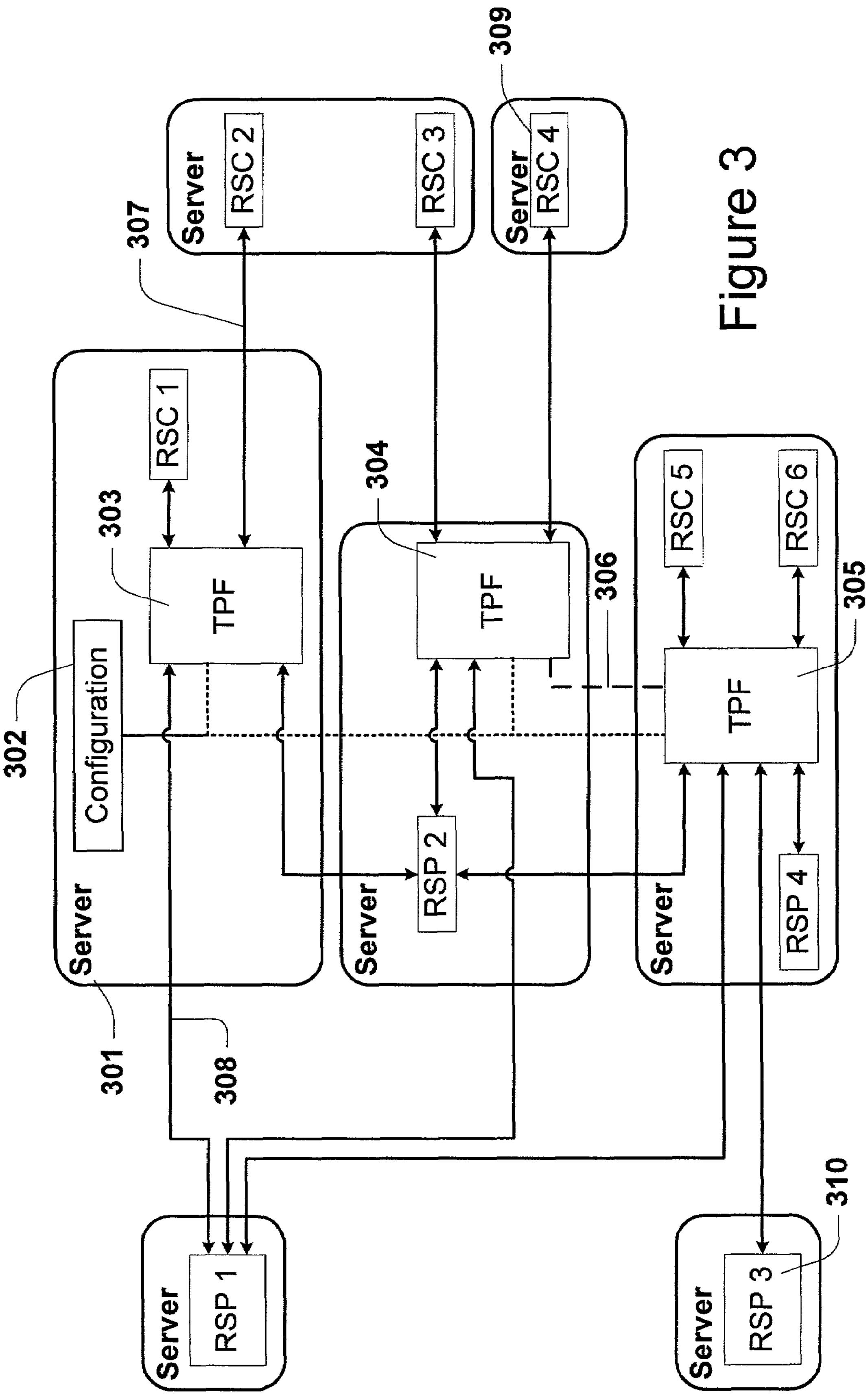

FIG. 3 shows an illustrative collaboration of three servers each containing a single TPF. Server 301 contains configuration 302, which is used by each TPF 303, 304, and 305 providing the binding specifications to the RSPs. In this configuration, TPF 304 and TPF 305 are able to interact using 306. TPF 303 is configured to run independently. In this collaboration example, RSPs and RSCs are shown running both on the same server as well as on different servers. The diagram is representative of the types of configurations that are possible. Connection 307 shows an external server with RSC2 connected to the TPF 303. Similarly, connection 308 binds an external RSP1 with the TPF 303. In practice, the connection 307 can be implemented using a variety of distributed protocols over many types of networks including the Internet, LAN, WAN and wireless networks.

The collaboration of FIG. 3 also shows a configuration that provides for delegation of transactions between TPFs 304 and 305. Consider the example where RSC 309 requests a transaction needing the services provided by RSP 310. TPF 304 analyzes the TD provided by 309 and determines that operation can be delegated to TPF 305. TPF 305 performs the operation with RSP 310 and then returns the results via TPF 304 to RSC 309. Subsequent aspects of the present invention further discuss the processing model for transactions.

Figure 4:
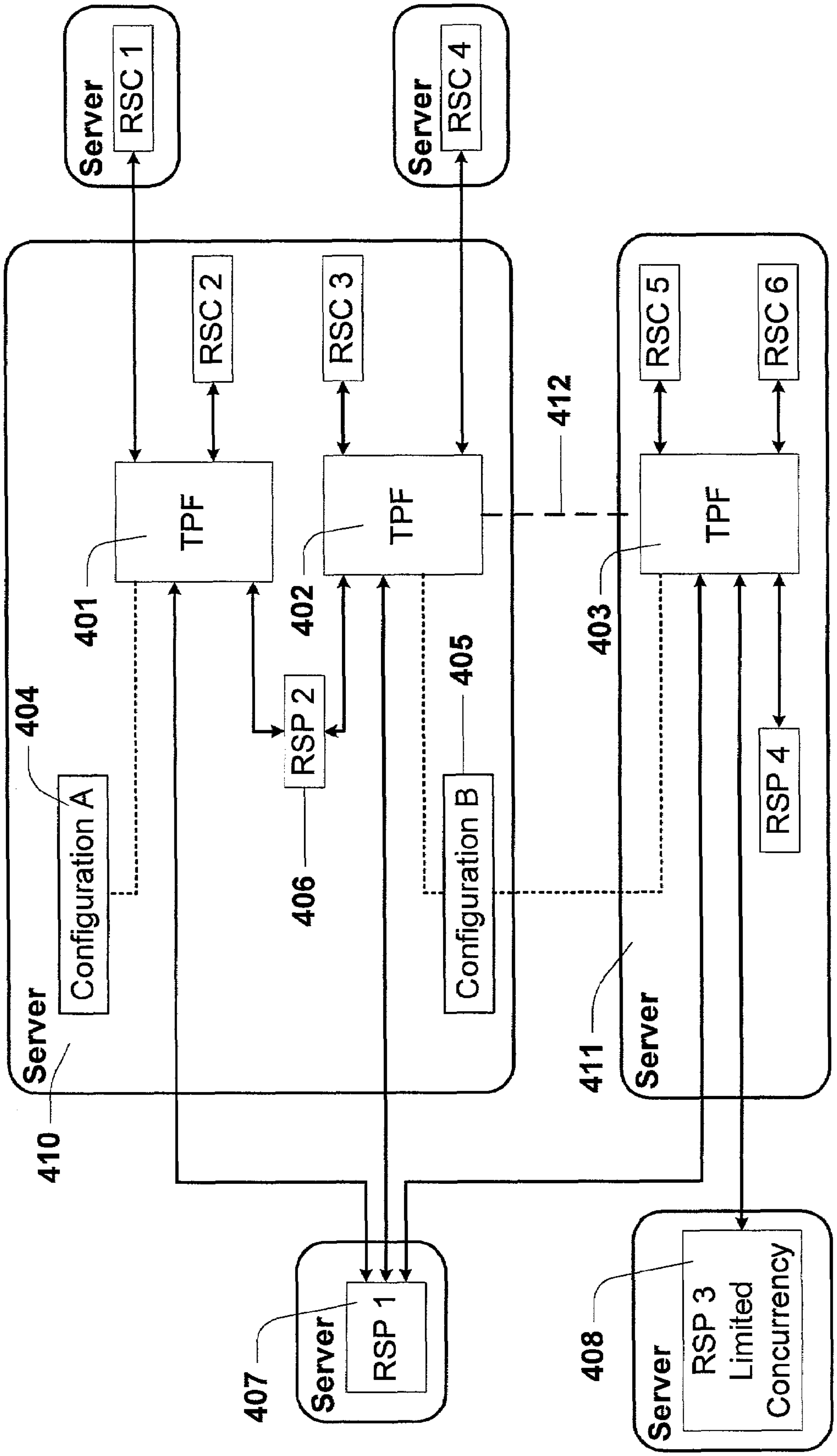

FIG. 4 shows an illustrative collaboration of multiple TPFs deployed on multiple servers 410 and 411. As with FIG. 3 the collaboration shows RSPs and RSCs connected to TPFs 401, 402, and 403 both locally and remotely using standardized integration means. The present invention supports configurations, where multiple TPFs may be deployed on a single server (such as with server 410). Situations may arise where completely independent instances of the software service on a machine are implemented in order to simplify configuration management. TPFs 401 and 402 are deployed on server 410 with completely separate configurations 404 and 405 and have shared RSPs 406 and 407. In this configuration, RSP 406 must be able to handle concurrent transactions from TPF 401 and 402, and RSP 407 must handle concurrent transactions from TPFs 401, 402, and 403. Also shown is delegation of transactions of TPF 402 to TPF 403 via connection 412. In this collaboration example, it is also possible for TPF 402 and 403 to balance transaction processing with RSP 407 to make most efficient use of server 410 and 411 resources. Additionally, the collaboration also shows TPF 403 controlling access to RSP 408. In the situation, where RSP 408 can handle a limited number of transactions at one time, TPF 403 provides the means to throttle the number of concurrent operations executed against RSP 408. Thus, an aspect of the present invention is to support parallel transactions that utilize the same services and may operate sequentially or with a limited parallel transaction means.

The intent of the present invention's operational model is to provide for maximum configuration flexibility such that the preferred embodiment can be configured as needed to achieve maximal performance. An additional aspect of the invention deployment model is the ability to incrementally add additional TPFs and servers to the configuration without requiring a termination of the existing transactions.

One objective of the present invention is to implement a common transaction framework that is suitable for a wide variety of services and supportive of the resources utilized by those services. The preferred embodiment utilizes abstraction to achieve the necessary standardization; this includes the use of a meta-model in the aspect of defining the TPF configuration. This section discloses the core elements and relationships of the TPF framework and provides the basis for discussing operational behavior in following sections.

Figure 5:
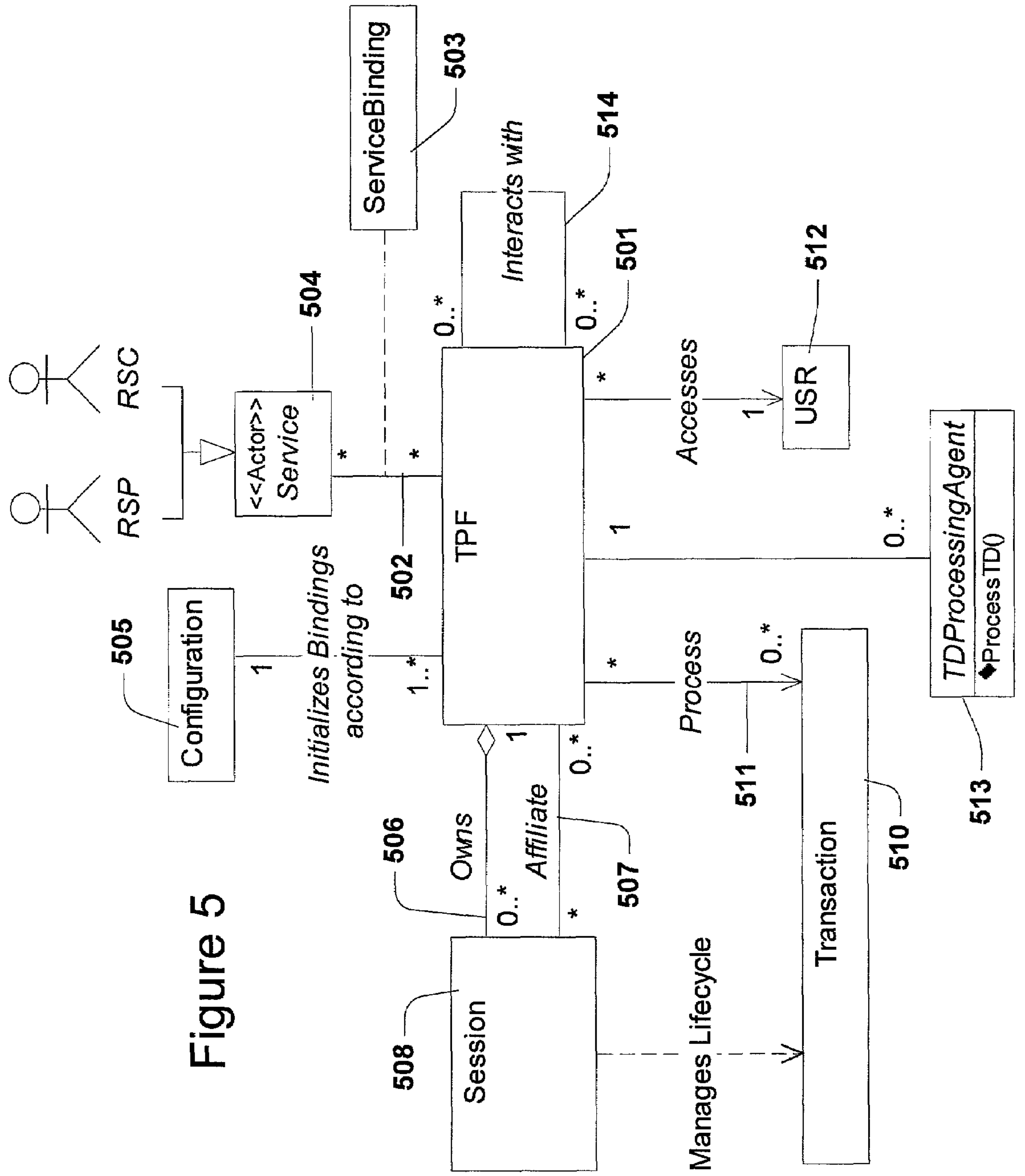
FIG. 5 shows a logical object relationship model that defines the primary domain elements and relationships to the TPF according to the present invention.

FIG. 5 shows one aspect of the TPF structural model according to the preferred embodiment. As with FIG. 1, the diagram shows a TPF 501 and relationships to the other primary objects comprising its core structure. Multiple TPFs 501 bind with zero or more service objects 504 using a service binding 503. A service binding describes the specific relationship between an instance of a service object 504 and instance of a TPF 501. The service binding of the present invention defines the characteristics of the connection including: connection identifier, access rights, supported resource types, connection mode, maximum concurrent transactions, and connection status. The Service Object 504 is a generalization of both the RSP and RSC since they share many of the same common binding characteristics. In the preferred embodiment the configuration object 505 stores the attributes of service bindings for each service object in a persistable format that is controlled by some configuration management means. At system initialization, the TPF 501 loads the persisted binding information and constructs an instance of the service binding for each service object according to the specified configuration. The service binding establishes a connection with the specified service object logging the status as appropriate.

FIG. 5 also shows the relationships 506 and 507 between the TPF 501 and the session 508. Zero or more session objects 506 are owned by a TPF. A session can be owned by one TPF at a time; however, an instance of a session may be affiliated 507 with zero or more TPFs in the course of a transaction. Each session controls the lifecycle of zero or more transactions for a particular RSC. In the preferred embodiment, the session typically creates transactions 510 that are processed by the owner TPF, but this is not exclusive. As appropriate, sessions may create transactions associated with affiliate TPFs 507 as well. Zero or more Transactions may be processed 511 by multiple TPFs. To support interpretation of transaction information, one or more TPFs use a Uniform Specification Repository (USR), which contains service, resource, and context class specifications. The repository is a collection of specifications conforming to the USM, which is defined in section Uniform Specification Model (USM). In addition, the TPF delegates TD processing to one or more TD Processing Agents 513. TD Processing Agents are externally provided functionality providing the TD language processing function, which is called by the TPF during the transaction process (see TPF Process Flow for details).

In the present invention's preferred embodiment, both RSPs and RSCs can be classified as to type or category of service as well as by the types of resources provided. This classification is useful, since it is possible to develop RSPs and RSCs that support standard service classes allowing RSPs or RSCs to manipulate resources given a particular class of service without regard for the specific instance of the class of service. Through this mechanism, services are further decoupled, as explicit knowledge of a service is not needed.

Figure 6:
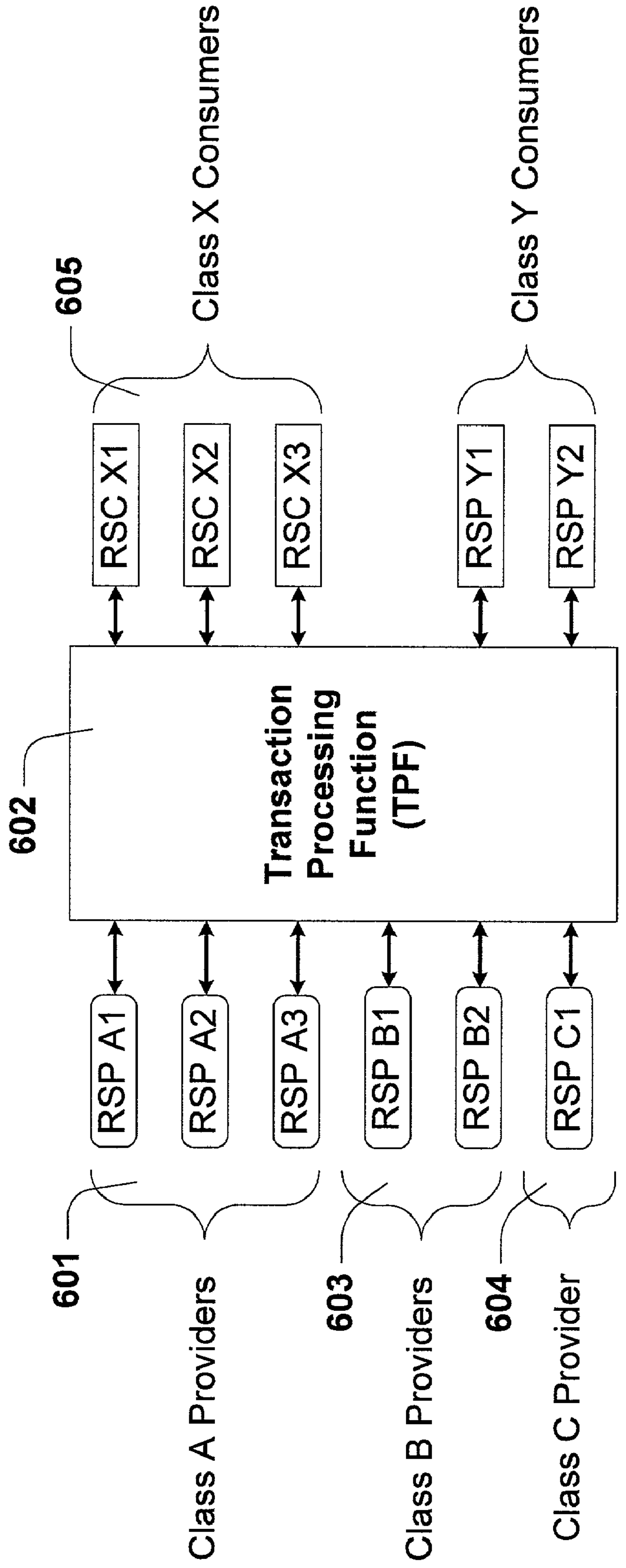
FIG. 6 is an illustrative system diagram showing classification of resource service providers and consumers according to an embodiment of the present invention.

FIG. 6 shows an illustrative collaboration of services and a TPF where services are classified according to some means. RSPs A1 through A3 (601) provide the same Class A services to TPF 602; similarly Class B 603 and Class C 604 are also connected to TPF 602. In this example Class X RSCs 605 are able to access any provider supporting Class A resources. The TPF 602 examines TDs originating from the Class X consumers and selects the appropriate Class A provider using one or more means such as count of active transactions or minimum cost of service.

To effectively manage transactions for a wide variety of resources, the present invention provides a uniform structure for describing resources, contexts, and service classifications. The TPF uses this class information to determine the specific service, resource and context configuration for each transaction. The class information is managed by the USR and is essentially constant during the lifecycle of a transaction. The processing method, expected results, input arguments, and system provided context data are defined using class information, such that the TD is expressed independently of any specific instances of services or information.

The use of context information in the present invention provides the means to dynamically control the processing strategy during the execution of a particular transaction.

Figure 7:
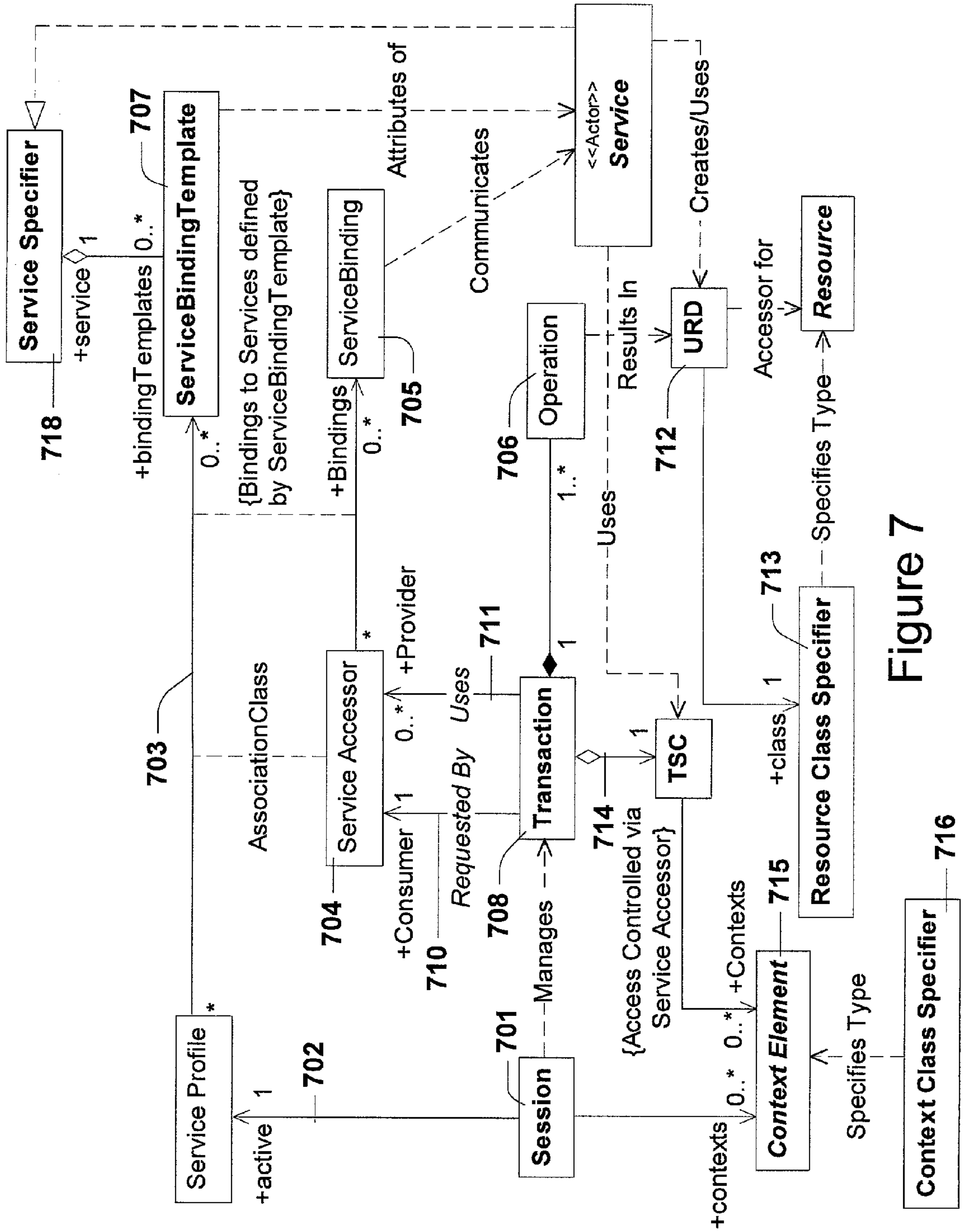
FIG. 7 shows a logical object relationship model describing the TPF primary structural elements and relationships. These elements provide the framework to process transactions according to the methods of the present invention.

FIG. 7 shows an additional aspect of the TPF core structure elements and relationships. In this view of the present invention, the TPF is not shown but is related to the session, transaction and TSC as shown in FIG. 5. The session 701 has an active Service Profile 702. The Service Profile manages the collection of services that may be used in the session. At session initialization, the active Service Profile 702 is configured according to some external configuration management means. Thus, services can be differentiated on a per session basis. No two sessions are required to have the same service profile. Service Profiles 703 are associated with zero or more ServiceBindingTemplates according to the instance attributes of the Service Accessor 704. In the present invention, the ServiceBindingTemplate 707 describes the mechanisms and attributes required to form a ServiceBinding 705. A Service Specifier 718 defines a specific service and has zero or more ServiceBindingTemplates 707, which can be used to establish a binding with the service. A ServiceBinding 705 is an instance of the mechanism defined by the ServiceBindingTemplate, connecting the service with the TPF. In relationship 703, only service profiles with appropriate access rights may access the associated service bindings 705. An example of a binding would be a connection to a service on the Internet that supports a SOAP API on a specific IP address and port. In support of multiple instances of TPFs being affiliated with a session object, the service accessor can be associated with multiple bindings as provided by the system configuration. The service accessor can select the appropriate binding given the TPF managing the transaction. In the preferred embodiment, the specific means for selecting the service binding would be dependent upon system configuration and transaction loading, but this does not preclude other means as needed.

FIG. 7 shows a transaction object 708 that exists within the lifecycle of a Session 701. Transactions are executed within the context of a session. For each transaction, subsets of the services associated with the Service Profile 702 are useable by the transaction 708. The transaction accesses these services via the service accessor 704 and Service Binding 705. The transaction has one ServiceAccesor that has the role of consumer 710. The consumer service is typically an RSC that requests the transaction; however, the preferred embodiment makes no internal distinction between RSCs and RSPs; RSPs may also execute transactions with the TPF as long as they have appropriate service access rights (according to the ServiceAccessor 704). The transaction has zero or more services that are providers 711 in the transaction. The providers are the targets of a specific transaction. Each Transaction will contain one or more ordered operations 706. As will be described further in the present invention, operations are atomic instruction sets executed by the TPF that interact with services to manipulate resources. Each operation 706 will consume, manipulate, or produce one or more Uniform Resource Descriptors (URDs )712. A URD 712 provides a means to reference and manipulate a resource within the transaction framework without explicitly accessing the resource. In the present invention, resources are not manipulated directly by the TPF, rather the TPF references the relevant resources using one or more URDs 712. Each RSP defines their own URDs that can be used to access the resources provided by their service. These URDs are defined in accordance with the structure model defined by the USM. The services that require direct access to the associated resource can de-reference the URD using an extraction method provided by the TPF. In the present invention, the means for extraction is specific to the class of resource. The URD 712 has a description of the Resource Class Specifier 713 as part of the preferred embodiment. The session and service provider use the knowledge of the resource class type when working with the resource indirectly. In this way, the present invention can perform transactions without explicit knowledge of the resources or services involved.

An additional aspect of the present invention shown in FIG. 7 is the association of TSC 714 with a transaction. As described previously, a TSC maintains information about the transaction situation context. This information is typically one or more elements that are useful during the processing of a transaction. The TSC 714 has zero or more associated context elements 715. The Context Class Specifier 716 specifies the specific nature and content of the context element. As with resources, the TPF manages context information in the course of a transaction, but does not interpret the information other than context type. Per the preferred embodiment of the present invention, context information can be used to affect the processing performed by services or the TDs processing flow (described in the section, Defining a Transaction with the TD).

The present invention provides a means for multiple services to interact without explicit knowledge of each other. To support implicit coupling, the preferred embodiment defines a uniform description model that allows specification of services, resources and transaction contexts independently of the service instance. All elements that are manipulated by TPFs are specifiable in terms of their characteristic attributes, and behavior. The TPF uses these specifications to dynamically determine transaction interaction between services. In the present invention, the TPF uses relationships and class type identifiers in its manipulation of services, resources and transaction contexts; direct interpretation and specific knowledge of class type is delegated to the services that specify support for the type in their USM data. In the preferred embodiment, the USM is factored such that it is compatible with other service and data classification models. The data model provided for in the Universal Description, Discovery, and Integration (UDDI www.uddi.org) standard is one example of a compatible classification model.

Figure 8:
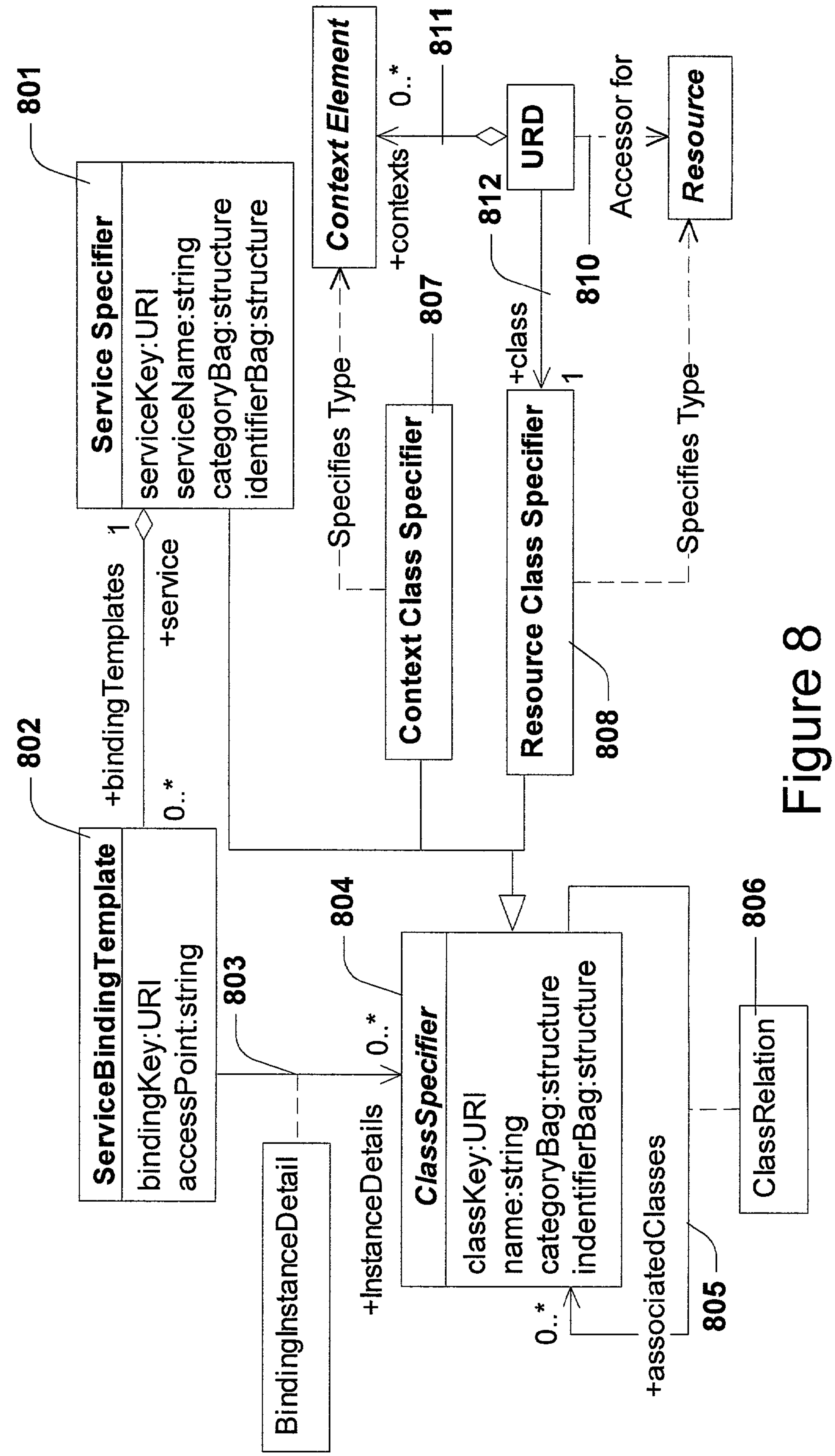
FIG. 8 shows a logical object relationship model of the Uniform Specification Model (USM), which provides the means for specifying service, related resources, contexts and other specifiers used by the TPF during transaction processing.

FIG. 8 shows the structure and relationships of the USM in the present invention. A Service Specifier 801, which uniquely defines an instance of a service, may have associated zero or more ServiceBindingTemplates 802. A ServiceBindingTemplate defines how services may be accessed. For each ServiceBindingTemplate, zero or more InstanceDetails 803 may be provided using ClassSpecifiers 804. These InstanceDetails characterize the specific nature of the binding. ClassSpecifier 804 represents the most generalized means of specifying type information and relationships used in the present invention. Each ClassSpecifier 804 may be associated with zero or more related ClassSpecifiers 805 according to the ClassRelation 806. In the preferred embodiment, all specifiers 801, 807, and 808 are specialized forms of the base ClassSpecifier 804 given their commonality of attributes. This modeling does not preclude the use of independent type specifiers for services, context, and resources, but rather seeks to optimize uniformity. For implementation performance, other models may be more appropriate; but their function is essentially the same. One benefit of the preferred embodiment using a base ClassSpecifier 804 is that future class types may be easily supported, allowing extensions to the present invention. Also shown in FIG. 8 are the URD and its relationship to resources 810, context elements 811, and resource class specifiers 812. URDs can contain contextual information, which provide more specific attributes for the reference resource, such that services can further process the resource information using the contextual attribute information without the need to de-reference the URD. One example is to provide location and categorization context attributes for services, which process information based on current location as well as filtering by category. Context attributes are assigned by services creating or processing the URDs. The TD specifies the desired URD context information to be used during execution of an operation with one or more services.

ClassSpecifiers are uniquely identified by some URI in a global sense. Additionally, specifiers are identified by a user-friendly name, a collection of categories, and a collection of identifiers. The present invention also provides for services to be associated with one or more class specifiers, indicating related specifications. The TPF may interpret category, identifier, and related class information to determine suitability of the defined element (service, context, resource, etc.) within the scope of a transaction. ClassSpecifier attributes are not limited to information supported by the TPF. In situations, where attributes are defined and not understood, the TPF simply ignores the information, and passes it along to any service or transaction as appropriate.

In the present invention, resources are defined using a specialized form of a class specifier. As defined previously, resources must be definable through a resource class specifier, such that its nature and function are explicitly defined. As needed, the TPF will process resource specifiers using classKey, categories, and identifiers to determine resource suitability within the scope a transaction or operation. Services and TD processing agents may also process resource class specifiers as part of the transaction as well.

A context element is a piece of information that may be useful during the processing of a transaction definition. Each transaction has zero or more context elements, that may be accessed as needed to supplement transaction information. A specialization of a class specifier, a context class specifier defines a particular context element class. The context specification may contain additional context specifiers, which further refine its definition. In the present invention, the TPF interprets the information of the context specification as it determines the required context information for a particular transaction.

Figure 9:
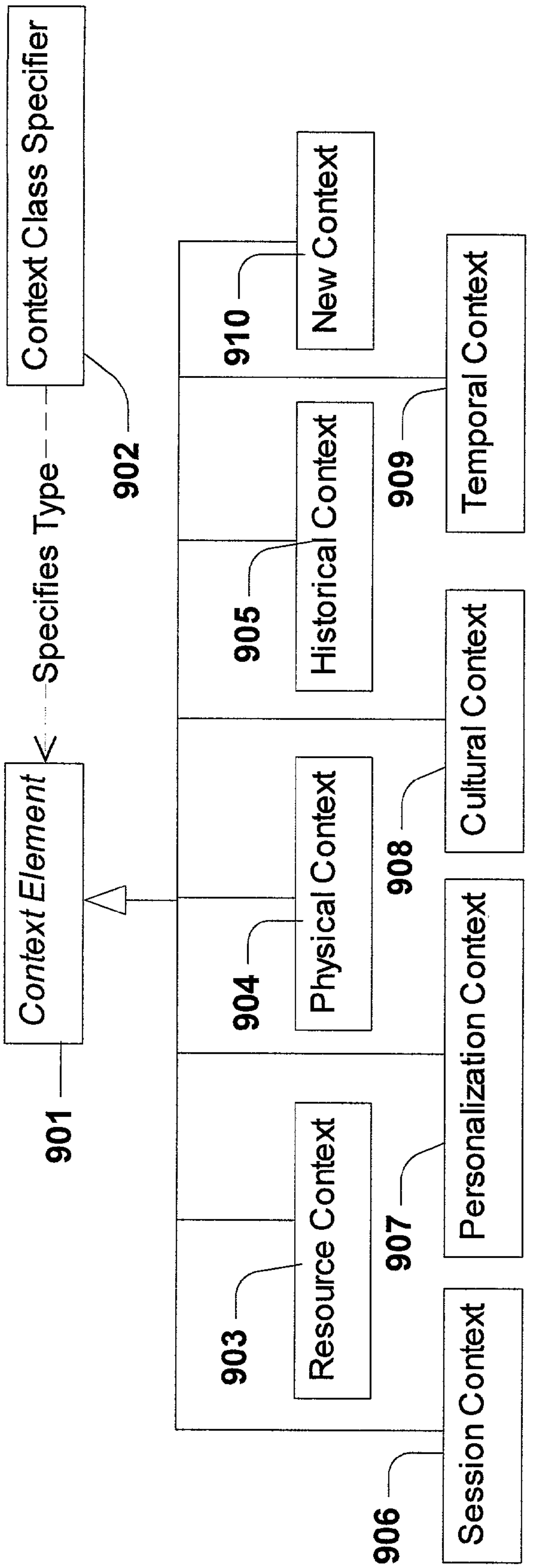
FIG. 9 is a logical object relationship diagram showing specialized context elements useful in defining transactions supporting personalization and localization. In accordance with the present invention, context elements provide related information not explicitly provided as part of the transaction.

FIG. 9 shows an illustrative set of context information that is useful to consider when processing transactions. Each context element shown is a specialization of the base Context Element 901 and is defined according to a Context Class Specifier. A Resource Context 903, is a context type that enables transactions to access related URDs. Physical Context 904 provides information regarding location, mode of travel, direction, destination, or any information that relates to the physical environment. Historical Context 905, provides access to a sessions transaction history, allowing transactions to process information in the context of previous transactions. Session Context 906 provides access to the current session state. For TPFs supporting membership (see Member Specialized Transaction Processing), contexts 907, 908, and 909 provide information relative to a TPF member. A Personalization Context 907 provides access to member related information not necessarily available through the Session Context. Cultural Context 908 defines regional and language information as well as any social or non-physical attributes that might be relevant to transaction processing. Temporal Context 909 provides access to time based information such as schedule. The preferred embodiment of the present invention provides class specifications of these contexts and others as part of the base configuration, as useful TDs will incorporate one or more of these contexts to better qualify transaction processing. New Contexts 910 can also be defined as provided by services or required by TDs, since the TPF framework only interprets context class information, other context classes can be simply registered in accordance with the USM and stored in the USR.

The present invention manages services according to their classification, supported contexts, and supported resources. The TPF uses service specifications to process each transaction in order to find the most appropriate provider for each transaction operation. TD processing agents may also interpret Service specifications as provided by the present invention. Each service wishing to be involved in transactions with the TPF must have a registered service specification in the USR that meets the structural definition described in the USM. Each service specification defines a unique URI (serviceKey) used to reference the service, a name for the service (serviceName), the categories of resources supported by the service and the identifiers for those resources. In addition, each service specification can define more attributes as needed for the service. For each service, its bindings and resources (if any) must also be defined. Binding information provides communication protocol and access information for a service. Services that are only consumers will not define any resources but will have at least one binding defined. The service bindings enable services to combine related functionality into groups with the same communication protocol and access point. Each binding/functional grouping can be further broken down into resources as needed, to provide fine-grained access to specified functions if needed.

With service specifications providing complete definitions of communication protocols and APIs, the TPF can validate a service and method call independently from the specific service. This ability decouples interface validation from a particular instance of a service and provides a means for handling programmatic errors without potentially corrupting a particular service. Further, with this information, the TPF can provide limited emulation of an API, which is useful for testing and validation of both RSPs and RSCs.

In the present invention, URDs are defined and associated with a particular session; as such, they are valid only during the scope of the session. This forces URD consumers to comply with the rules and access model defined by the session object. With this relationship, the URD can be de-referenced by a TPF affiliated with the session. In the preferred embodiment, the URD is de-referenced, which returns the specified resource in a format specified by the caller. In some cases the URD may actually contain the resource rather than reference it as may be appropriate for small amounts of data, where additional transactions may create unwarranted overhead. In these situations, the URD will be identified as containing information rather than referencing it. In the preferred embodiment, information contained in the URD can be extracted directly, without interacting with the session. This relaxation of the access model is dependent on the resource class specifier information, and provides a means for performance optimization, where appropriate.

In the present invention, services initiate one or more transactions within the scope of a session; such transactions require that services and resources be identified by class type, category, or some other characteristic so that the TPF may select the appropriate services and specific resource instances based on the session service profile and TSC. In the preferred embodiment of the present invention, transactions are defined as a series of operations with one or more services, either consumers or providers. The exact sequence of operations and processing algorithm is described by an externally provided TD. The TD defines the types of services, classes of resources involved, context information, transaction process flow, and caller arguments. In the present invention, the TPF processes the TD prior to execution of the transaction, establishing TD validity and the specific service operations to execute.

Figure 10:
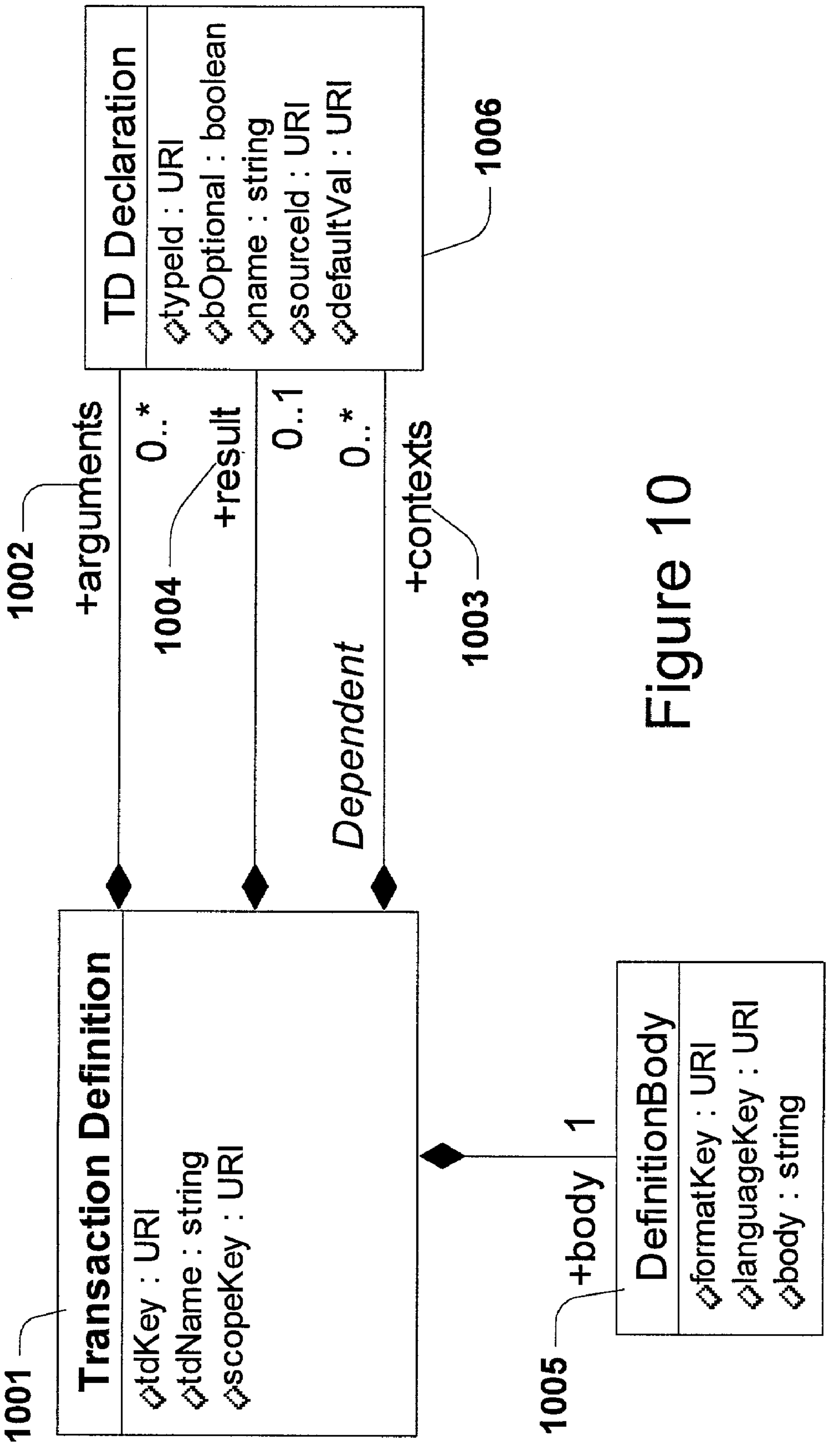
FIG. 10 is a logical object relationship diagram showing the logical structure of the Transaction Definition (TD). TDs provide a means to define a transactions input and output arguments, required context information, and functional definition. The TD Definition body is attributed with format and language keys, such that it can be processed using an external TD Processing Agent.

FIG. 10 shows a simplified logical model for the TD as defined in the preferred embodiment. The TD 1001 can be uniquely identified by an optional tdKey, which provides the TPF a means to manage TDs between and outside the scope of sessions. The TD also has an optional name, which provides a user-friendly means to identify the TD. In the preferred embodiment, the TD also has a scope key, which defines, where and how the TD may be used. Scope keys include, but are not limited to the following values: transaction, session, service, and global. Additional scope keys may be defined as appropriate to control visibility of the TD. Though not shown, other attributes for the TD are defined by the preferred embodiment including but not limited to version identifier, source identifier, validity time period, and TD summary description. The TD 1001 may contain zero or more argument declarations 1002, which define calling arguments to be provided at the time of TD execution. The use of arguments, allows a TD to be defined in general terms at a time prior to its use. The TD 1001 may contain zero or more context declarations 1003, which define what contexts are used within the scope of the DefinitionBody 1005. The TD 1001 may also declare a result 1004, which specifies the output of the transaction. The present invention can support any type of result as long as the required URD extraction means are available within the context of the executing transaction. In the present invention, the TD Declaration 1006 specifies the type of value, name, optional/required usage specifier, optional source identifier, and an optional default value. The DefinitionBody 1005 contains the transaction process specification in the body attribute. In the present invention, the specification of the transaction is defined using the language identified by the language key URI. The present invention may support multiple languages as provided by the particular TPF configuration. In the preferred embodiment, the Definition Body is processed by an associated external processing agent, which supports the specified languageKey, and formatKey. With the provision of the languageKey and formatKey, the language used to describe the transaction can be specified independent of the TPF function; this extends utility, and provides for a more flexible system. Languages that are suitable for describing a transaction include but are not limited to Java, JScript, Visual Basic, VBScript, SQL, and natural English language.

FIG. 11 shows an illustrative TD fragment depicted using XML and JScript. The TD implements a transaction that maps caller specified resources within the proximity of the current location and matching the specified search string. The example shows a very simple representation of the basic concepts as implemented by the preferred embodiment in the present invention. The XML tag 1101 defines the beginning of a TD using the XML namespace, 'TPF.types.TransactionDefinition'. The TD is specified with a tdKey and tdName as shown 1101. The TD is also defined with global scope, meaning no restrictions on usage. Statements 1102 define the TD arguments and required contexts. In this example, the TD requires two external and one internal input argument: the resourceClass, search string, and transaction object; additionally, the TD uses the current location context. Statement 1103 denotes the beginning of the TD body and defines that the body uses UTF-8 format using the Java script language. The body of the TD consists of two primary functions: 1104 executes a call to find resources in proximity to the location context and 1105 maps the results centered on the current location. Statements 1104 build an argument list from the specified input parameters and then execute the 'FindNearby' method on services that support the 'ProximitySearchApi'. In the present invention, TDs are able to access TPF functionality using some well-known means. In this case, the 'tx' object defined by the argument in 1102. Statements 1105 maps the results from 1104 if any are provided. Statements 1106 specify a Map as the return result and show the closing tags for the body and TD blocks.

According to the present invention and as shown by FIG. 10 and FIG. 11, the TD thus defines the nature and process of the transaction. TDs are provided prior to or at the time of the transaction and are uniquely identified according to some URI. TDs quantitatively define all input and outputs of the transaction, and the TD can be verified for correctness prior to execution of the transaction. The preferred embodiment uses a more complex form than described here to accommodate version control, security and other aspects common to a large scale solution; however, the previous discussion should be sufficient for one skilled in the art to define a workable implementation.

Figure 12:
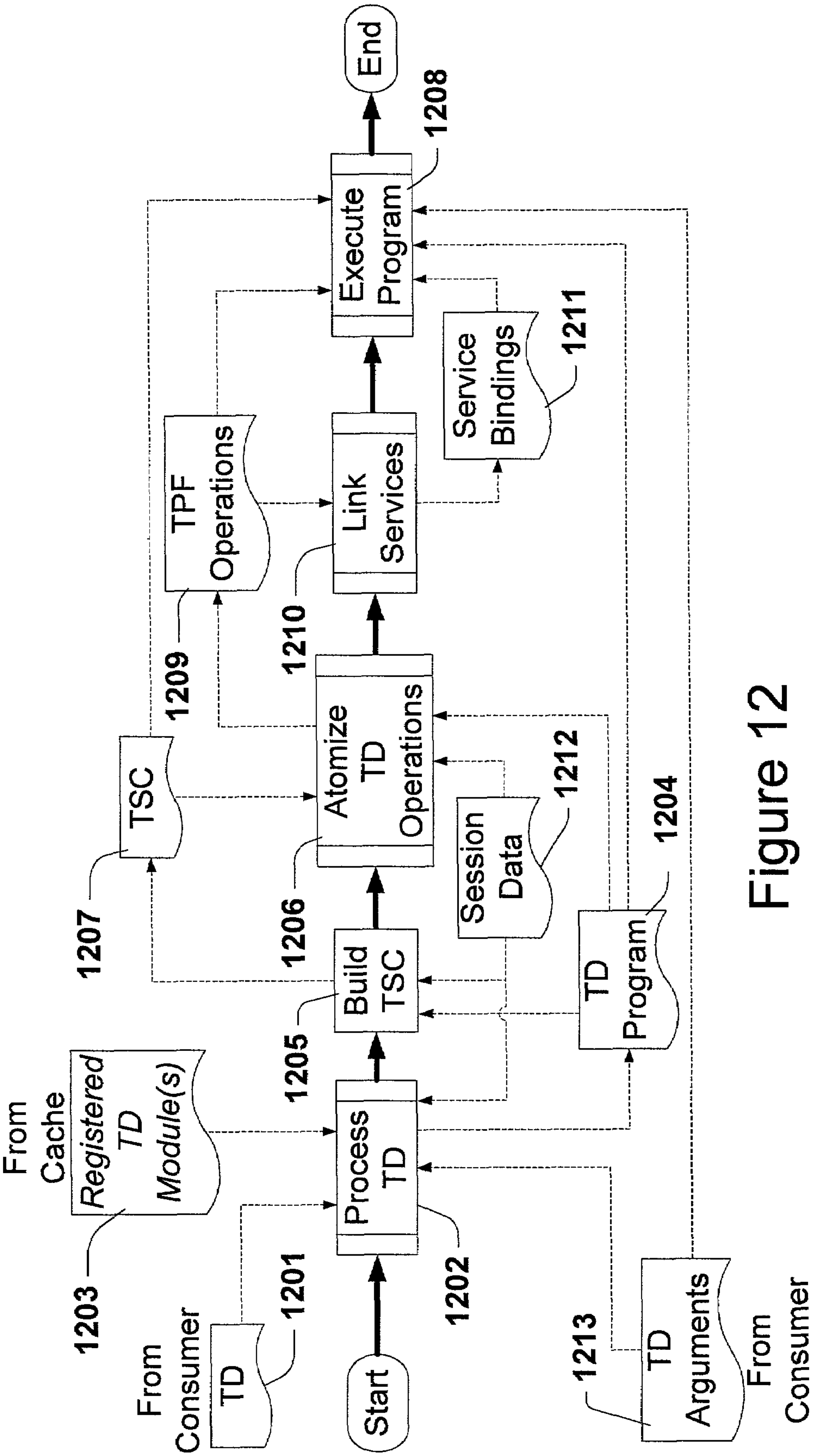
FIGS. 12-16 are process flow diagrams showing the TPF method for processing TDs and executing operations with RSPs. The process is comprised of five major functions: TD processing, TSC construction, TD operation decomposition (atomization), service linking, and TD Program execution.

The present invention executes a transaction according to a TD. The RSC initiating the transaction submits a TD to the TPF, where upon it is processed according to the associated session data: namely, the available services, resources and context information. FIG. 12 shows the TPF transaction process flow and associated data elements as defined by the present invention. The diagram shows the primary process flow for successfully executing a transaction. In the preferred embodiment, other flows managing failure are also supported, but not shown for clarity. A transaction begins by processing the TD 1201 using the Process TD function 1202. Additional session data 1212 and other registered TDs 1203 are also provided in order to resolve TD 1201 references. In the preferred embodiment, all TPF processing functions are able to access information contained in a Uniform Specification Repository 512 as shown in FIG. 5, which allows for interpretation of TD class specifiers as needed. The registered TDs 1203 are managed by some external cache management or storage function providing efficient access to a TD using either the TDs tdKey or tdName as appropriate. Upon completion of TD Processing in 1202, a TD Program 1204 is produced for subsequent processing. The Build TSC function 1205 uses the session data to construct a TSC with the needed contexts as specified by the TD Program 1204 (see Processing TDs for more information on the structure and content of a TD Program). The preferred embodiment constructs the TSC by simply locating or creating the context elements specified by the TD Program. However, the present invention does not exclude other means for construction as defined by other implementations. The TSC 1207 produced is used by the Execute Program function 1208.

Continuing with FIG. 12, successful completion of the Build TSC 1205 the TPF transaction then decomposes the TD operations into atomic service operations using the Atomize TD Operations function 1206 (see Atomizing TPF Operations for details). Using the TD Program information 1204, function 1206 produces a table of atomic TPF operations 1209, which is used by the execute program function 1208. Following completion of function 1206, the services specified in the TPF operations 1209 are evaluated for optimal binding according to the Link Services function 1210 (see Linking Services for details). From Linking Services 1210, a service binding information table 1211 is produced and used by the Execute Program function 1208. With the successful completion of the execute program 1208, the transaction ends.

One concern present with the described transaction processing flow is the need for optimal performance. As discussed previously, the process for interpreting and executing a TD can be process intensive. The construction of the process flow model is such that optimizations can be applied at one or more points in the flow, eliminating redundant processing. The use of cached TDs, TD Programs, TSCs, TPF Operations, and Service Bindings can substantially reduce the processing overhead in the TPF prior to TD execution. For example, caching the TD Program would allow the TPF to bypass the Process TD function 1202 entirely, which would substantially reduce processing times for complicated TDs. The preferred embodiment of the TPF actively minimizes the transaction-processing overhead using multiple means that can vary on a transaction basis.

Figure 13:
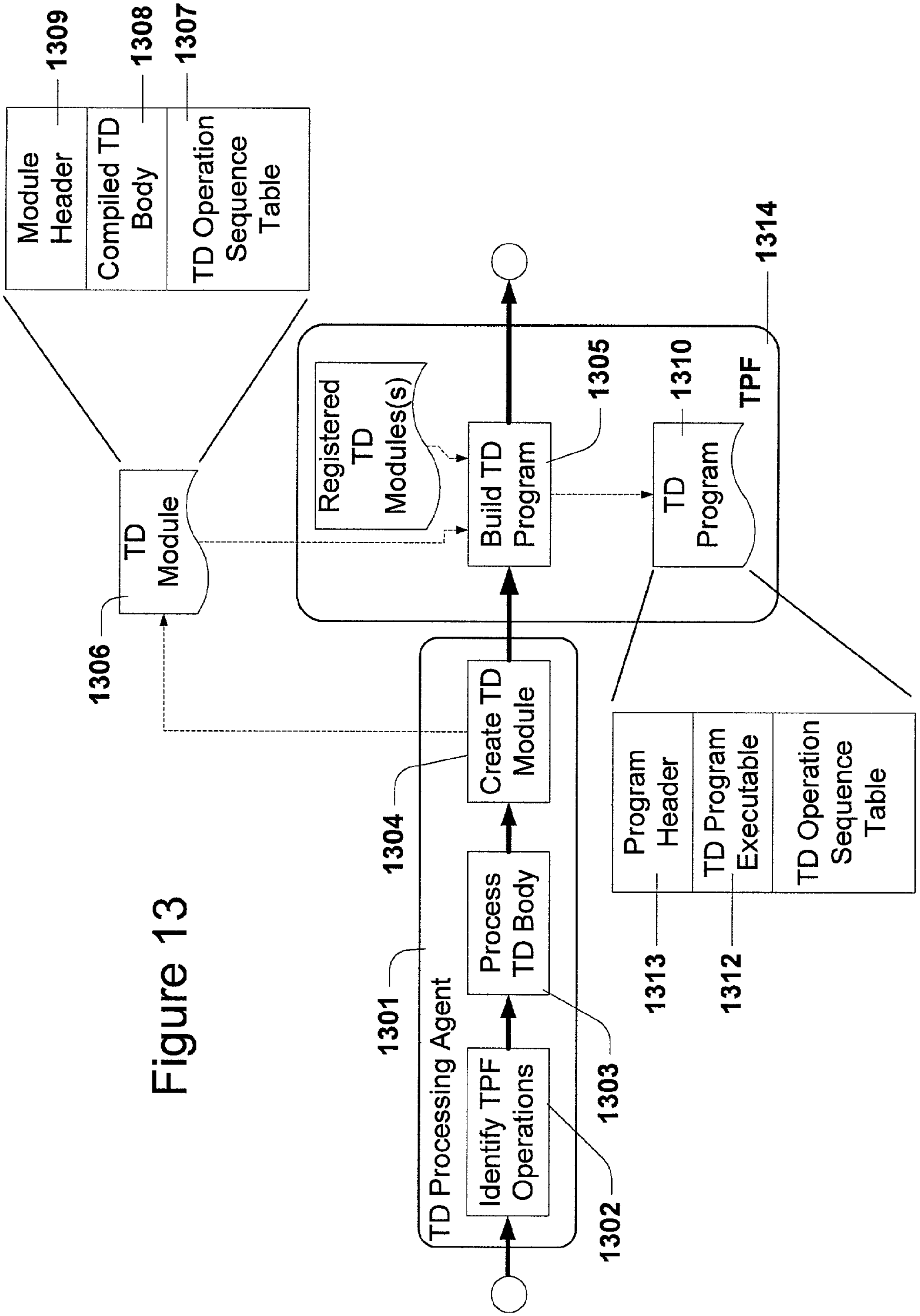

FIG. 13 shows the steps for processing a TD. The bulk of TD processing is handled by an external TD Processing Agent 1301, which is determined according to the languageKey and formatKey specified in the TD Definition Body 1005. The TD Processing Agent 1301 provides a means to interpret the TD, producing TD Module information that is interpretable by the TPF function, Build TD Program 1305. The TD Module is a self-contained, processed version of the TD that is more optimally structured for access and use by the TPF and other system functions. The TD Module 1306 contains a Module Header 1309, a 'ready to execute' version of the TD DefinitionBody 1308, and a table of TD Operation Sequences 1307. The ModuleHeader 1309 contains a copy of the information defined in the TransactionDefinition 1001 in FIG. 10 as well as expected results, input arguments, and other information as required by some cache or storage management means.

In general, processing agent 1301 identifies TPF operations 1302 storing the information in the TD Operation Sequence table 1307. A TD operation sequence is defined as any function call from within the TD Definition Body that requires action by the TPF. They are termed operation sequences since each operation sequence will be further decomposed into atomic operations as provided by the Atomize TD Operations 1204 in FIG. 12. The Process TD Body function 1303 modifies or compiles the TD Definition Body as needed to produce a 'ready to run' form. The exact processing is specific to the TD Processing Agent 1301 and is external to the TPF. The TPF delegates execution of the TD body to the processing agent, which eliminates the need for interpretation by the TPF; this is discussed further in Executing TD Program. In general, the processing agent completes TD processing by creating the TD Module 1306, which is passed back to the TPF for further processing. The last step in TD processing is to build a TD program 1310. The Build TD Program function 1305 is performed by the TPF 1314 and resolves TD references to other registered or provided TDs and combines module data into one complete TD Program 1310. Before a referenced TD can be used, it is verified that invoking service has authorization to use it. The structure of the TD Program is essentially the same as the TD Module 1306, but with additional information about other referenced TD modules. The Program Header 1313 defines the expected results and input arguments similar to Module Header 1309. The TD Program Executable 1312 contains all information needed to execute the program without additional pre-processing.

Fundamentally, TD Processing provides a means to convert raw TDs into a form that is readily suitable for processing by the TPF. The TD Module and TD Program represent this prepared form. Once these elements are constructed, the original TD is no longer used or processed by the TPF. By caching the TD Module or TD Program, TD processing can be bypassed almost entirely.

Figure 14:
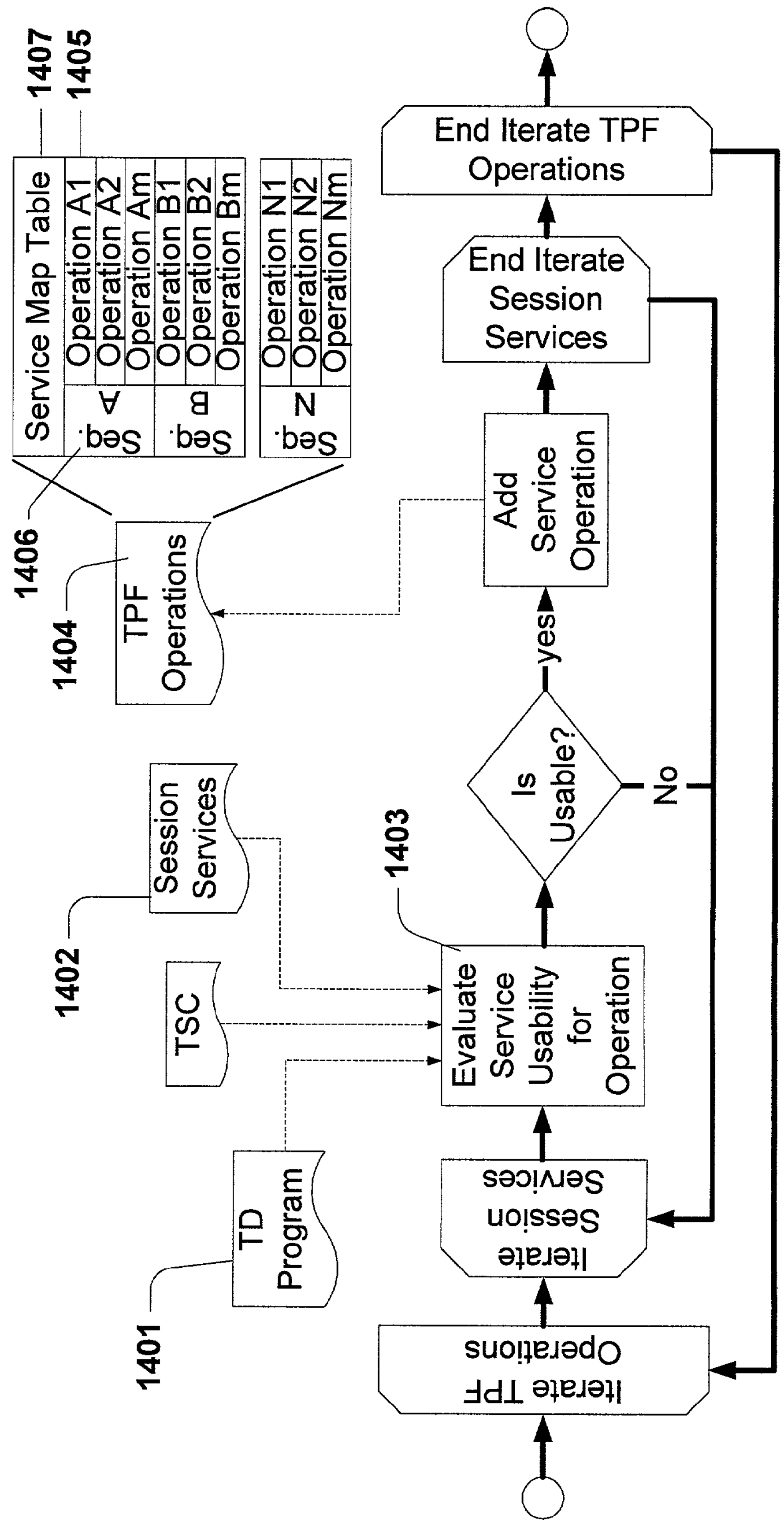
Figure 15:
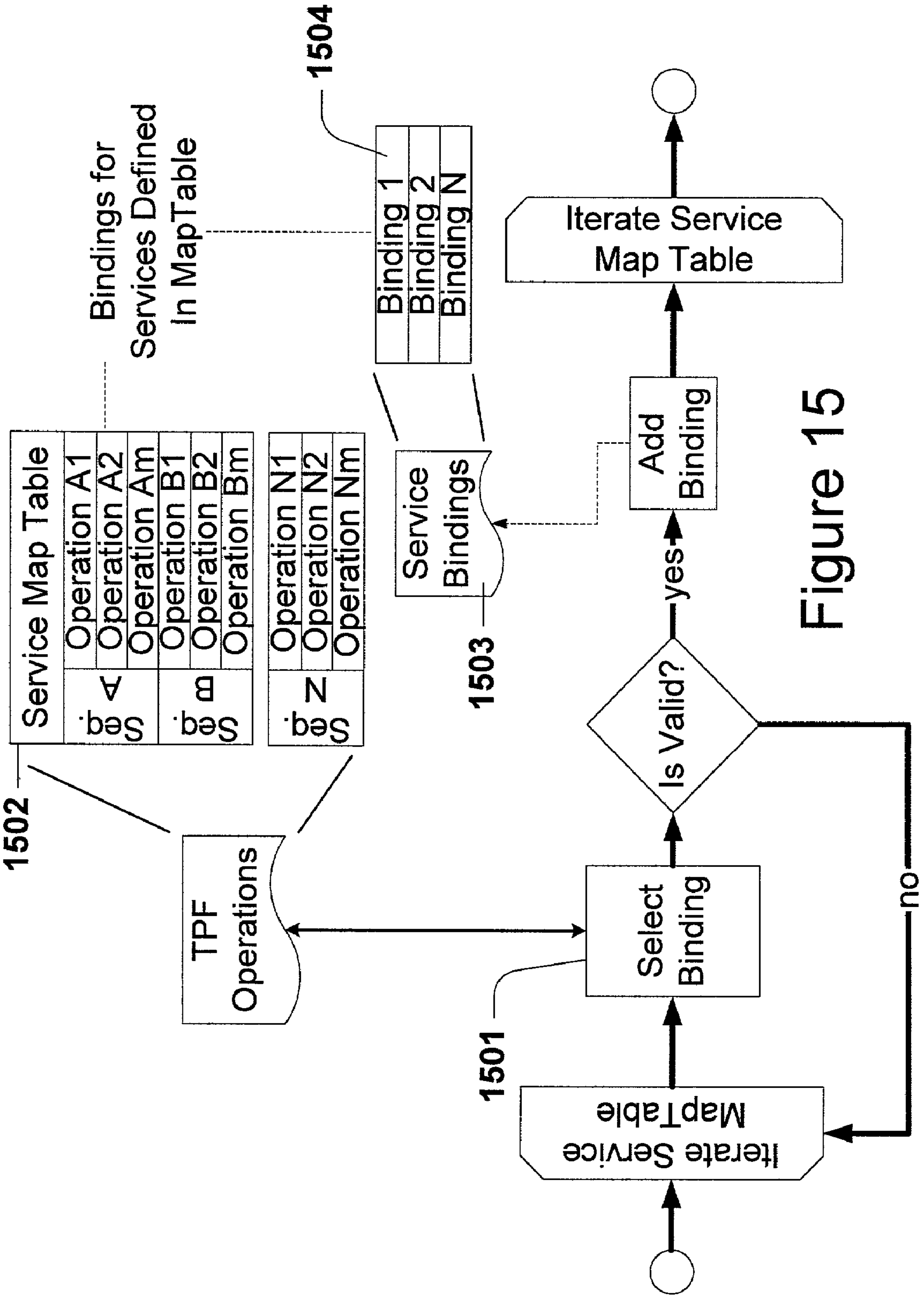

FIG. 14 shows the general process for atomizing TD Operation Sequences. The process iterates the set of TD Operation Sequences contained in the TD Program 1401. For each TD operation sequence, the process iterates the set of available services as defined by the session data. For each operation, the services are evaluated for suitability in 1403. If the result is suitable, one or more operations for the specified service (as needed) are added to the TPF operations object 1404. This process continues until all possible combinations of services and operations for this transaction are completed. The means to evaluate service/operation suitability in 1403 can be accomplished using any number of methods. The preferred embodiment provides the means to specify the evaluation function 1403 within the TD; providing a flexible means to change how services and operations are matched on a per session and transaction basis. The default version of the evaluation function examines the services definition specified in the Uniform Specification Repository and compares it against the operation specification. Services that support the specified operation and class of resources requested are deemed suitable, returning a favorable result. When the process is complete, the TPF Operations data object 1404 contains the complete set of TPF operations for the entire TD program. The operations 1405 are grouped according to the TD operation sequence 1406 for which they are associated. Each operation represents an atomic transaction between a TPF and a service. The data object contains a service map table 1407, that allows in mapping of services onto the operations. This is provided for subsequent operations to resolve service bindings independent of TPF operation specifications.

Prior to execution, the TPF operations must be bound to the selected services; some means for selection is required. The preferred embodiment allows the binding method to be specified via the TD. As such, the binding method can vary from one transaction and session to the next. One simple method of selection is to select the binding of the TPF processing the transaction if possible, otherwise select first valid binding. Other selection methods are possible, the preferred embodiment provides the means to specify the binding selection method on a per session basis. Other methods might include service cost, performance impact, and most recently used. Given a particular binding selection function 1501, the TPF iterates over the service map table 1502 selecting the valid bindings and adding them to a service binding data object 1503. Once completed, the Service Bindings object 1503 will contain valid service bindings 1504 for use in execution of the TD. Any service defined in 1502 without a valid service binding will simply result in a 'no' operation.

Figure 16:
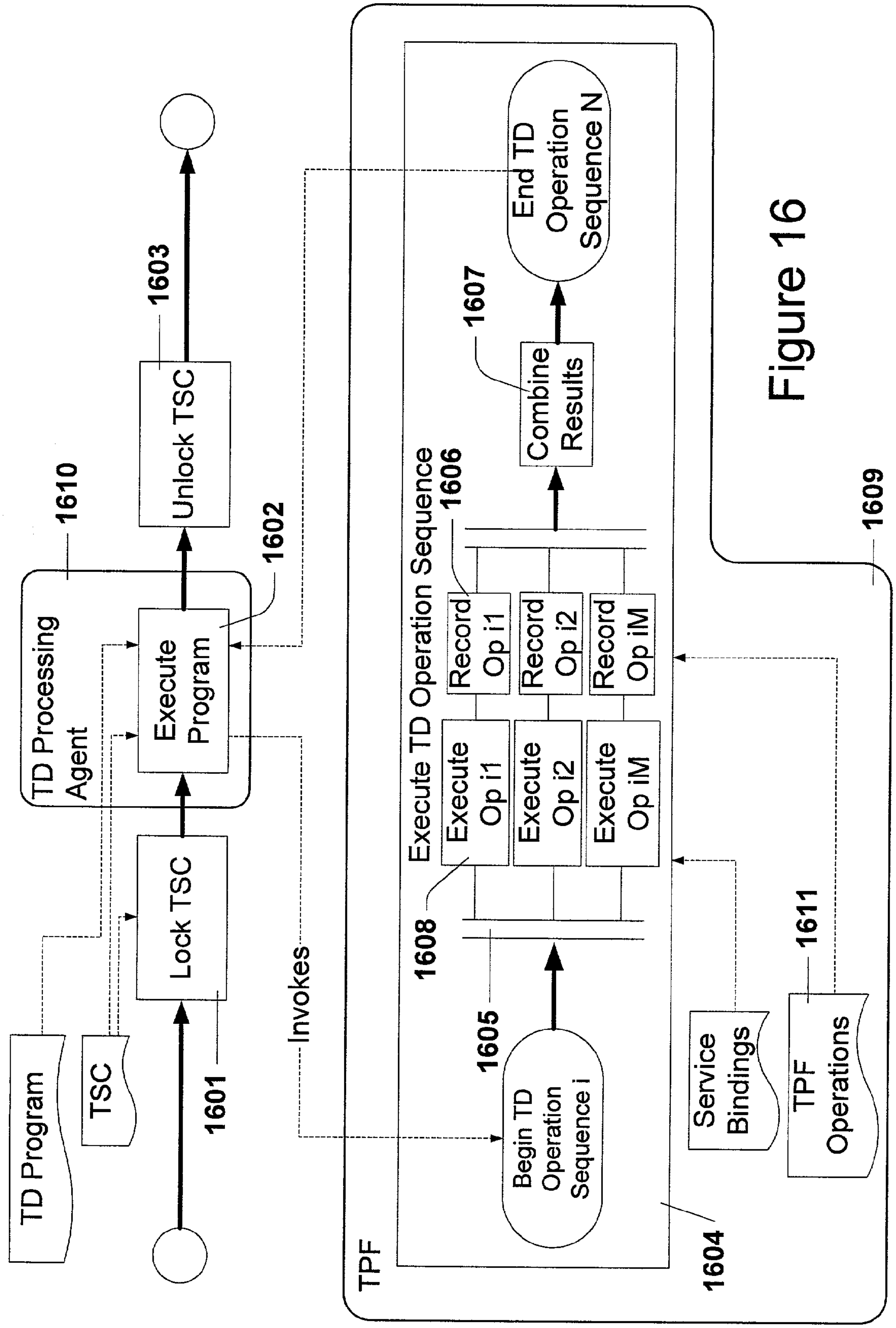

With the TD Program, TSC, TPF Operations, and Service Bindings defined, the TPF can then execute the transaction. FIG. 16 shows the general sequence for executing a transaction. Execution begins with locking the TSC 1601; this prevents it from changing state during the course of the transaction. Once locked, the TSC and TD Program are passed to the Execute Program function 1602. The TD Processing Agent 1610 that used the original TD in FIG. 13 provides the corresponding Execute Program function 1602. The exact function of 1610 is dependent upon the agent, but in general, 1610 will periodically request the TPF 1609 to process a sequence of operations 1604 during program execution. The order in which TD operation sequences are invoked is dependent upon the TD program. For the 'ith' operation sequence 1604, the TPF 1609 executes, in parallel 1605, the associated atomic operations defined by the TPF operations object. Upon completion, each operation as specified by the service binding is recorded by the TPF 1606. The record of the transaction can be used subsequently to report transaction history. With operations sequences consisting of multiple operations 1608, the results are combined 1607 into one set of information prior to returning control to the TD Processing Agent 1610. Upon completion of the TD program execution in 1602, the lock on the TSC state is released in 1603.

If the TD Program returns a result, it is packaged in 1602 and passed to the TPF upon completion. The TPF will pass the return result to the initiating service.

One aspect of the present invention to improve transaction-processing performance is to register TDs prior to their use. TD processing can be done independent of a particular transaction, and in some cases, atomizing operations and linking services as well. Registration also provides the benefit of making TDs available for others to use independent of session. More complex TDs can be created that reference other TDs, providing a flexible reusable framework of transaction functionality.

Further, TD Registration enables a set of TDs can be associated to form an API, which can be registered and subsequently classified using the Uniform Services Model. In this fashion, the present invention supports aggregation of services and to form new APIs tailored to meet any number of requirements.

With support for TD registration, the preferred embodiment also provides a means to authenticate and validate TDs, particularly for TDs with global or public scope. This allows the TPF system operator to control functionality available to the TPF consumers. Further TD registration can be secured and limited to specific sessions using TPF functions described previously by creating a TD registration service that is an RSP. In a similar fashion, TD API publication can be accomplished through a TD publication RSP.

In general, all interactions with the TPF, including transactions, configuration, service registration, and TD registration, are managed by the TPF transaction process flow.

The TPF processing model described previously provides a generalized synchronous framework for services to interact without explicit coupling, using session information to dynamically determine bindings between services for a particular transaction. In another aspect of the invention, the TPF provides an asynchronous transaction capability, where transactions are processed independently of the originating process. This function enables the TPF to support lengthy transaction processing without blocking the invoker. In addition, asynchronous transactions provide a means to support transactions between sessions. In the preferred embodiment, asynchronous transactions are supported by the TPF using a first-in-first-out ordering mechanism, where TDs are placed on a queue until processed. The process for executing an asynchronous transaction is identical to synchronous transactions as described previously, with the exception that the TPF initiates the transaction using internal processing resources rather than some external RSC initiator. As a result, asynchronous transactions have no return result, and error conditions or exceptions would be logged using some reporting means. If required, transaction ordering for a session can be preserved within a single TPF and across multiple TPF configurations, where services have only one binding with the system. Services requiring transaction order preservation would specify 'one' as the maximum number of concurrent session transactions in the service-binding template. In configurations where multiple service bindings exist, ordering is not necessarily preserved since concurrent transactions with a service can be executed simultaneously. Services supporting multiple bindings, would take care of transaction ordering itself if required.

Figure 17:
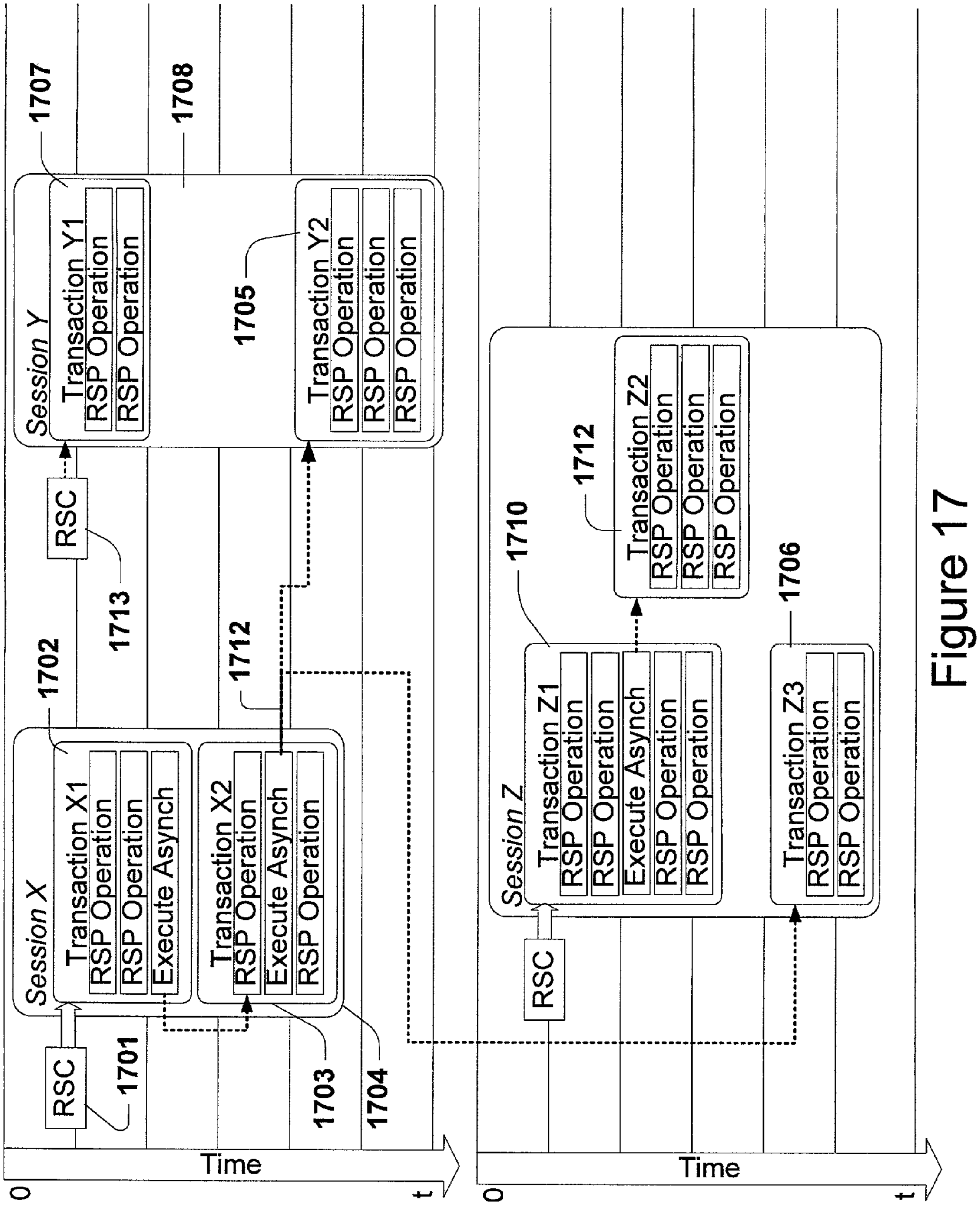
FIG. 17 is an illustrative sequence diagram showing both synchronous and asynchronous transaction scenarios. The TPFs support asynchronous transactions that cross session boundaries.

FIG. 17 shows an illustrative sequence of both synchronous and asynchronous transactions. RSC 1701 initiates synchronous transaction 1702 in session 1704, which executes two operations before initiating an asynchronous transaction 1703. Transaction 1702 completes and returns control to RSC 1701. Later, transaction 1703 is executed by the TPF in the scope of the session 1704. This sequence of transactions, 1702 and 1703, shows order preservation within a session. Cross-session asynchronous transactions are shown by 1703, 1705, and 1706. Transaction 1703 initiates two transactions 1705 and 1706. With no particular restrictions, the TPF proceeds with execution of the transaction 1705 and 1706 as soon as possible. As shown, transaction 1706 executes slightly after transaction 1705. A single TD 1712 initiates the asynchronous transactions 1705 and 1706. In the preferred embodiment, the same TD can be used to execute different transactions on different sessions concurrently. Thus, TD processing is minimized and independent of the number of concurrent transactions. Asynchronous transactions can also be executed by external services as shown by RSC 1713. RSC 1713 initiates a transaction asynchronously, which is subsequently executed by the TPF in FIFO manner. Transactions 1710 and 1712 show an asynchronous transaction, where ordering is not preserved. In this case, 1712 executes prior to completion of 1710. This may occur in situations, where services do not overlap or the services support multiple concurrent transactions per session.

As discussed previously, multiple TPFs can be used to coordinate transaction processing between one or more servers, distributing transaction processing according to the session's service binding function. In the present invention, each instance of a TPF provides some or all aspects of the processing functions; where in the event that a single TPF has partial functionality, others are available to provide other functions needed to complete the entire processing sequence. Most practical configurations will optimize server configurations to support maximal performance at a minimum of cost; thus the TPF preferred embodiment, allows for distribution of internal functionality across multiple servers as needed. The transaction-processing model shown in FIG. 12 is designed as a linear process, where each functional element operates independently passing well-defined data-objects (1201, 1203, 1204, 1207, 1209, 1211) along the chain. To optimize the maximum concurrent transactions and to minimize allocation of limited operating system resources, the preferred embodiment of the TPF processing model implements transaction processing as a sequence of asynchronous messages, wherein the transaction state is maintained by the transaction object as shown in FIG. 5.

In the case of multiple TPFs, each TPF will have a transaction object with transaction state information for the particular TPF. A first TPF can delegate one or more functions to other TPFs by sending its transaction state and appropriate data objects to the other TPFs. The other TPFs instantiate their own transaction with state information provided by the first TPF and continues processing at the point specified by the originating message. Using the asynchronous processing infrastructure as discussed previously, the TPF processes the delegated functions as it would any other transaction in FIFO order. In the preferred embodiment, a priority may be assigned to particular transactions to optimize processing efficiency, giving preference to internal transactions or delegates as needed.

Figure 18:
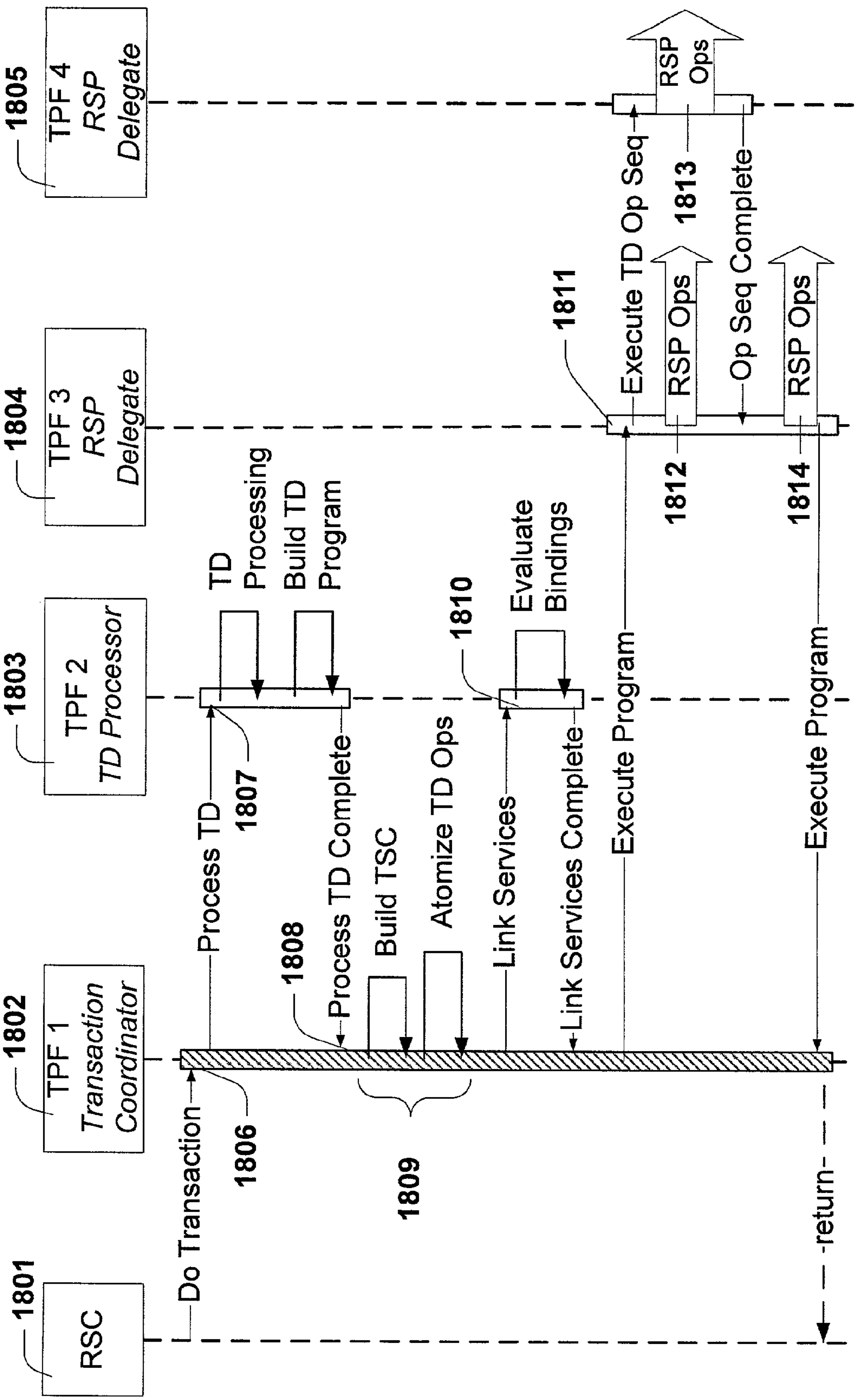
FIGS. 18 and 19 are illustrative sequence diagrams showing one configuration of the TPF structural elements in the execution of one or more transactions according to the embodiment of the present invention.

FIG. 18 shows an illustrative distributed transaction processing sequence with one RSC 1801 and four TPFs (1802, 1803, 1804, and 1805). The strategy for distributed processing is controlled in part by the TPF configuration and bound services. The RSC initiates a synchronous transaction 1806 with TPF 1802, which acts principally as the transaction coordinator. TPF 1802 in turn delegates TD Processing 1807 to TPF 1803 asynchronously, such that TPF 1802 is free to continue other processing while 1803 processes the TD. Upon completion of processing, the TPF 1803 notifies 1802 of TD processing completion. TPF 1802 continues the transaction processing 1809, using internal processing resources to construct the TSC and atomize operations. Service Linking 1810 is delegated to 1803, which again notifies 1802 upon completion. TPF 1802 then delegates transaction execution to TPF 1804, which acts as an RSP delegate. For some configurations, delegation of execution control to other TPFs can significantly improve system efficiency, limiting overhead and network congestion, as is shown by 1811, By delegating execution to 1804, which has bindings to RSPs used in the course of processing, TPF 1802 can save costly network transactions. As part of bindings selected, during service linking, 1804 further delegates a portion of the RSP operations 1813 to TPF 1805, which it executes concurrently with its own RSP operations 1812. When both RSP operations are completed, TPF 1804 continues processing, with subsequent RSP operations 1814. Once the execution completes, TPF 1804 notifies 1802 with the results, which complete the transaction processing sequence and returns the results at the completion of 1806.

In the present invention, both the TPF system configuration and service linking control distributed transaction processing. The exact distribution of transaction functionality is determined at the time of the transaction, and may vary according to current system load and transaction definition. This distributed transaction model provides a flexible configuration framework that allows operators to deploy additional servers where additional performance is needed. Further, with some dynamic configuration management means, processing distribution can change and adjust as the system comes under load, taking advantage of idle resources.

If implemented as described previously, the TPF would typically process all aspects of a TD for each transaction. While this provides maximal flexibility, the potential performance cost is high when considering that a number of transactions will be essentially the same with the exception of input and TSC data. From an RSC perspective, the majority of the processing performed by the TPF would be considered management overhead, as the bulk of the transaction should be handled by one or more RSPs. As a result, methods for improving TPF performance are fundamental to the preferred embodiment. Given the potential for a TD to be executed multiple times in multiple sessions, the present invention provides for optimizations that can greatly improve the average performance of a particular TD. With consideration that TDs will be executed more than once, the present invention caches one or more of the intermediate data objects, such that these data objects can be quickly accessed during subsequent transactions. In this way, The TPF can bypass parts of the transaction process where intermediate data objects already exist in cache.

In particular, the TPF may cache TD modules, TD programs, static context data, service operations, and session service bindings using some external cache management function that allows rapid retrieval of data using multiple indexes. These data are stored and indexed according to their data type, tdKey, session, scope of use, and ranking. By caching TD Modules and TD Programs, subsequent TD processing can be eliminated for those sessions with appropriate scope access. This optimization alone can save significant transaction processing overhead.

Figure 19:
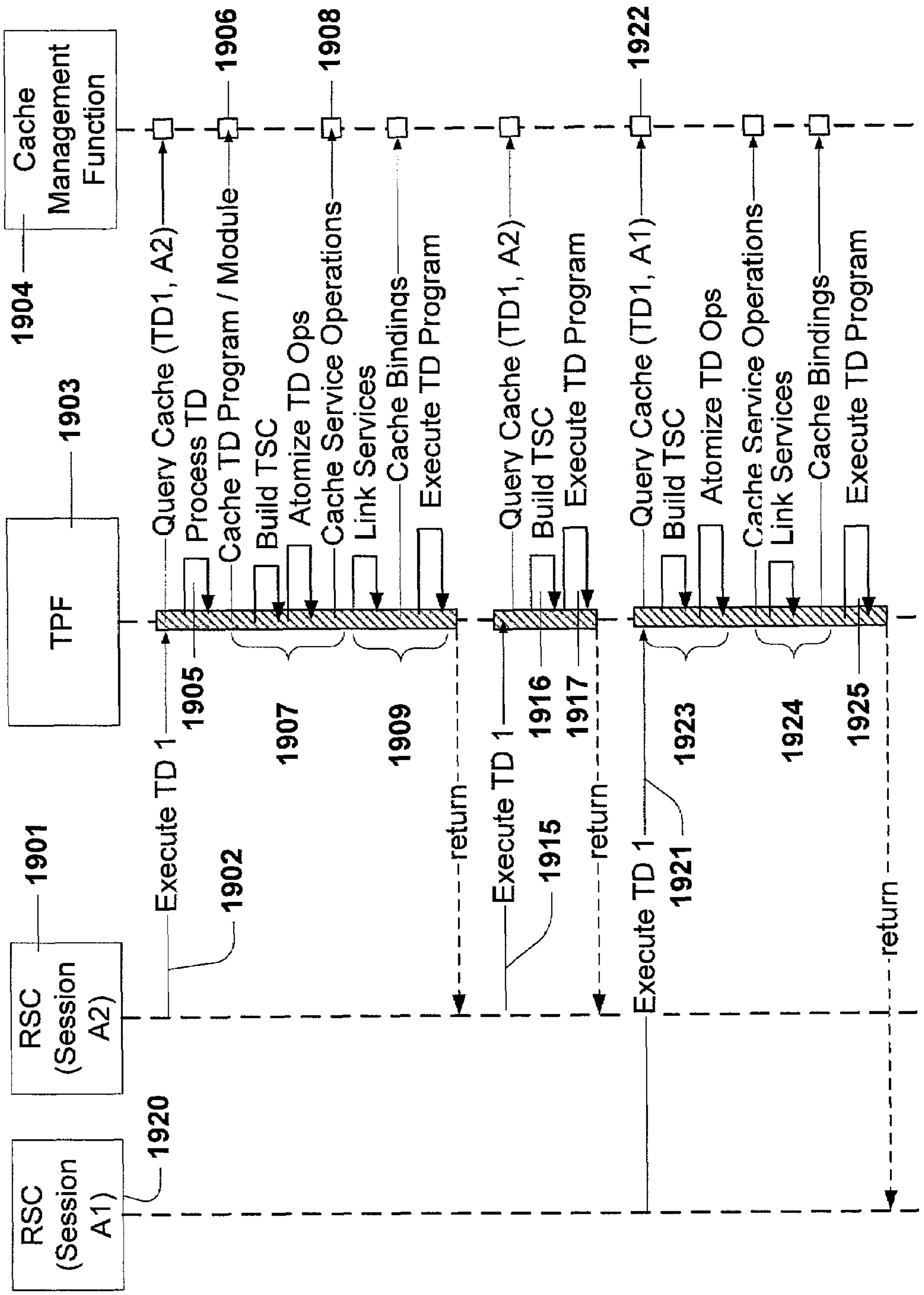

FIG. 19 shows an illustrative sequence of transactions including performance optimizations. RSC 1901 in the context of some session A2 initiates a transaction 1902 according to the definition TD1. The TPF 1903 first queries the cache management function 1904 for any cached information relating to TD1 and session A2. The cache management function 1904 returns, indicating that no previous information exists in regards to TD1. TPF 1903 processes TD1 in 1905, producing a TD Module and TD Program. These are subsequently registered 1906 with the Cache Management function. The TPF continues transaction processing building the TSC and atomizing TD operations such that the set of specific TPF/service operations is generated in 1907. The TPF caches the service operations in 1908. In 1909, the transaction concludes by linking the services, caching the service bindings and executing the TD program. Once cached, the intermediate data products of TD1 can be referenced by other transactions executing within the system of TPFs according to the present invention. In a later transaction, RSC 1901 again executes a transaction according to the definition TD1 in 1915. In this case, the query for data related to TD1 and session A2 in 1904 results in returning the previously cached data: TD program, TD module, service operations, and service bindings. The TPF then skips TD processing and builds the TSC directly in 1916. Following this, atomization and linking are skipped and the TD program executes in 1917. Thus, with caching, session A2 can eliminate three of the five processing steps when executing TD1. This will be true for subsequent transactions within the scope of session A2. Caching can also benefit other sessions executing in the same system of TPFs. RSC 1920 initiates a transaction within scope of session A2 in accordance to the definition TD1 in 1921. The TPF queries the cache manager for information related to TD1 and session A1 in 1922. In this case, the cache management function only has session independent information of TD1. The TPF proceeds with transaction processing, building the TSC and atomizing TD operations in 1923. The service operations are cached for TD1 with context of session A1 in 1924. These can be retrieved by session A1 for subsequent TD1 type transactions. The TPF then links the services, caches the service bindings and then executes the TD Program having bypassed processing the TD in 1925. Thus, for this scenario, one of the five processing steps was eliminated when executing TD1.

In the present invention, caching of intermediate transaction data products can be performed serially as in the previous illustration or all at once (or burst caching) as required for optimal performance. In certain situations, the cache management function may reside on a separate server from the TPF; in which case, burst caching would be preferred since it requires less frequent communications over the network. The cache management function may hold intermediate transaction information for a limited period due to limited processing or storage resources. In such cases, the cache may manage the information according to some means. Most recently used (MRU) and complexity costs are examples of suitable algorithms in the preferred embodiment. If one or more aspects of the transaction data are not available, the TPF can simply regenerate the data using one or more parts of the transaction process.

To further reduce performance overhead in processing, Registered TDs can be pre-processed prior to use, such that cached information is readily available. In addition, static elements of the TSC can be defined outside the scope of the transaction, such that TSC construction is minimized.

Up to this point, the present invention (as described) supports a transaction processing framework where services can initiate transactions that involve other services base on a system configuration that limits access to services, resources and contextual information based on the access privileges granted to the initiating service.

Figure 20:
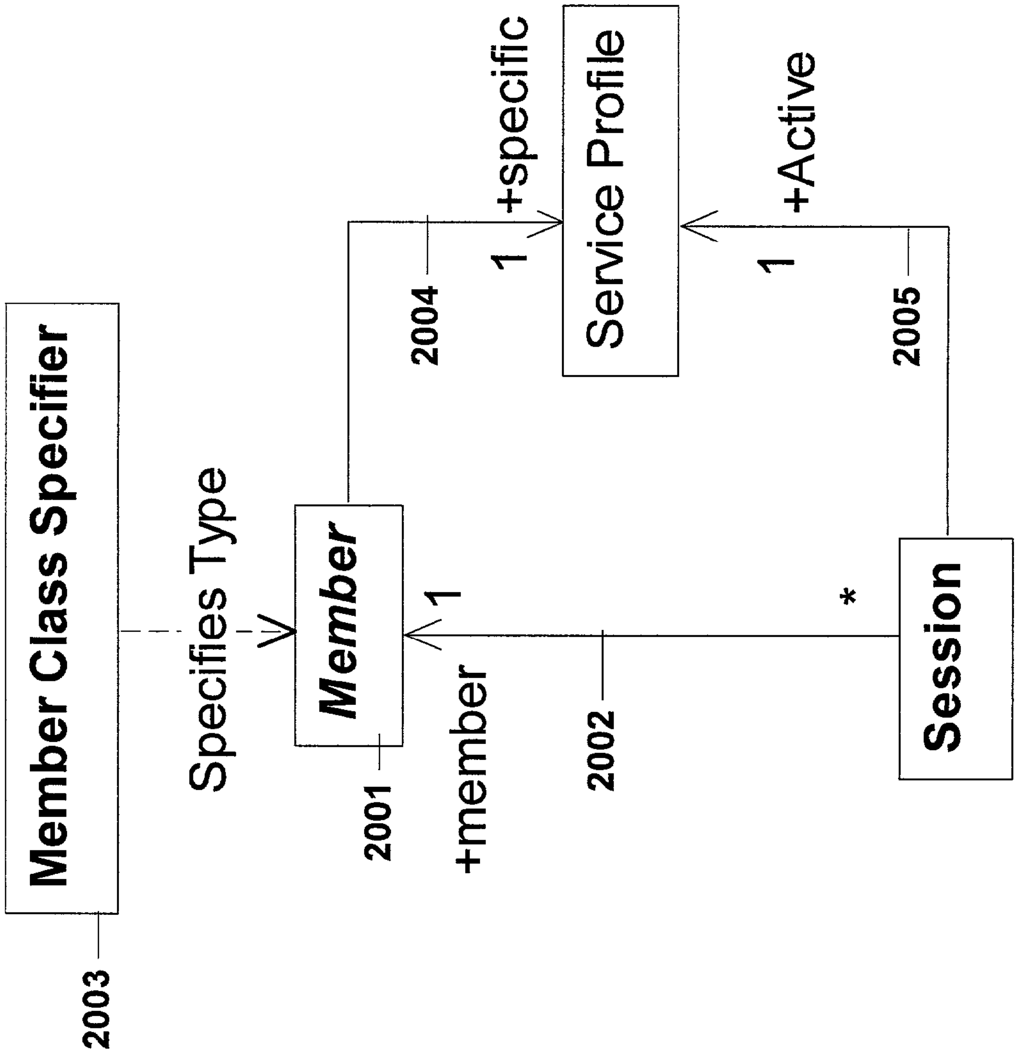
FIG. 20 is a logical object relationship model showing an extension of the core domain model to include the concept of membership and member classification according to an aspect of the present invention.

FIG. 20 shows a logical object relationship model that provides for member information extensions to the base TPF structural model as shown in FIG. 7. The present invention provides for TPF sessions to be associated with a member, enabling transactions to adapt processing according to member state. A member 2001 is the object for which sessions are created and transactions executed. Through the USM model, member objects in the TPF are classified according to the Member Class Specifier 2003. Zero or more sessions may be associated 2002 with a member. With this structure, the TPF can support state information across multiple, but related sessions. The transactions that affect the member outside the scope of a transaction can be effectively controlled and manipulated via the TPF framework. The member object has ownership of a specific service profile 2004, which is associated with each session 2005 as the active Service Profile. Each session object associated with a member 2001 has the same service profile as the member to provide for session scope transaction optimization. Given multiple member sessions using the same service profile, the TPF framework can further optimize transaction processing by caching transaction data objects (see previous section) at member scope, whereby the associated sessions can access service operations and bindings as if they were created by the same session. This approach provides for more efficient cache management as commonly accessed TD information can be related to a session without explicit association to the session.

The member object is designed for specialization in that the TPF only manages services with respect to member types. Services may choose to define additional member types via the Member Class Specifier 2003 and associate various TDs, resources, etc. with each type. Examples of specialized member types include users, organizations, sensors, and administrators. The present invention provides for qualifying sessions and service profiles based on member attributes, but leaves precise definition of member to the specific TPF system configuration. Fundamentally, the TPF supports multiple member types concurrently.

Another extension to the base TPF processing structure is the provision for domain specific transaction processing. The preferred embodiment of the present invention allows for session and member state information to be organized according their domain of use. The domain itself is defined externally and is used internally to classify and structure services hierarchically among a group of members. The utility of this structural extension provides for session transactions to be managed with respect to domain and member information, in that the services can be commonly defined for a particular domain and made available to any number of members belonging to the domain. Further, the TPF can record session transactions with respect to member and domain such that utilization can be reported in aggregate for a group of users. In many service models, some grouping mechanism is typically required to support related sets of information. The domain extension allows the TPF to support these constructs natively and constrain TD processing accordingly.

Figure 21:
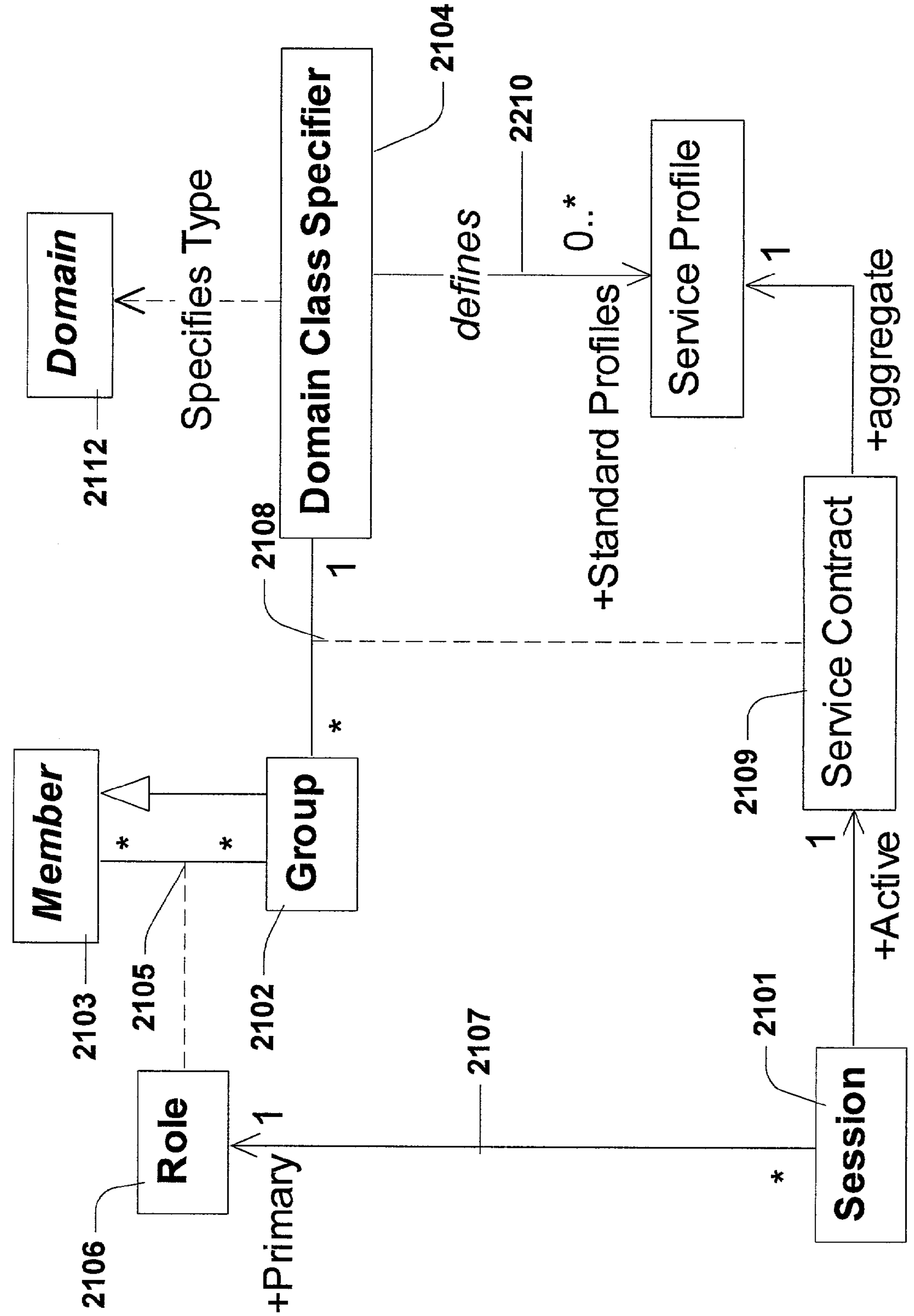
FIG. 21 is a logical object relationship model showing a further extension of the domain model of FIG. 20 to support multiple processing domains for each member according to yet another aspect of the present invention.

FIG. 21 shows an object relationship model indicating the domain structural extensions to the TPF core structure as shown in FIG. 7. As with the membership extension previously discussed, a member object 2103 is provided to support intersession state information; however, with domain extensions, a Group object 2102 is provided, which represents a group of members. Many members can be associated 2105 with many group objects according to the role specifier 2106. The role specifier 2106 defines the relationship between the member and the group. In the preferred embodiment, the role object defines ownership, access, and type of relationship. To support hierarchical structure, the Group object 2102 is a specialization of the Member 2103, which provides for groups associated with groups. Multiple session objects are associated 2107 with a role object 2107. By associating sessions to a role 2106 rather than the member object 2103, sessions can be created for the same member, but in different domains. The group object is related to a domain via the association 2108 with one Domain Class Specifier 2104. The group's specific relationship with the domain 2112 is specified by the service contract 2109. To provide for standardized services within a domain, the domain class specifier defines zero or more standard service profiles 2110. Each group has a specific service profile based on a standard profile or a subset thereof, as provided for in the service contract 2109. With this structure, multiple groups in the same domain can share common service profiles, allowing the TPF to cache TD information at the group level or even the domain level as appropriate. Further, this structure is also useful for service management as the service contract and standard profiles provides a convenient storage model for organization of services across multiple domains.

Domain specialization is more elaborate than the member specialization of FIG. 20 and is considered an alternate form. Typically, an implementation of a TPF would support either extension but not both concurrently as they have conflicting or redundant structure. The structure of FIG. 21, however can behave identically to the membership extension if the cardinality of the roles and group are limited to one.

Figure 22:
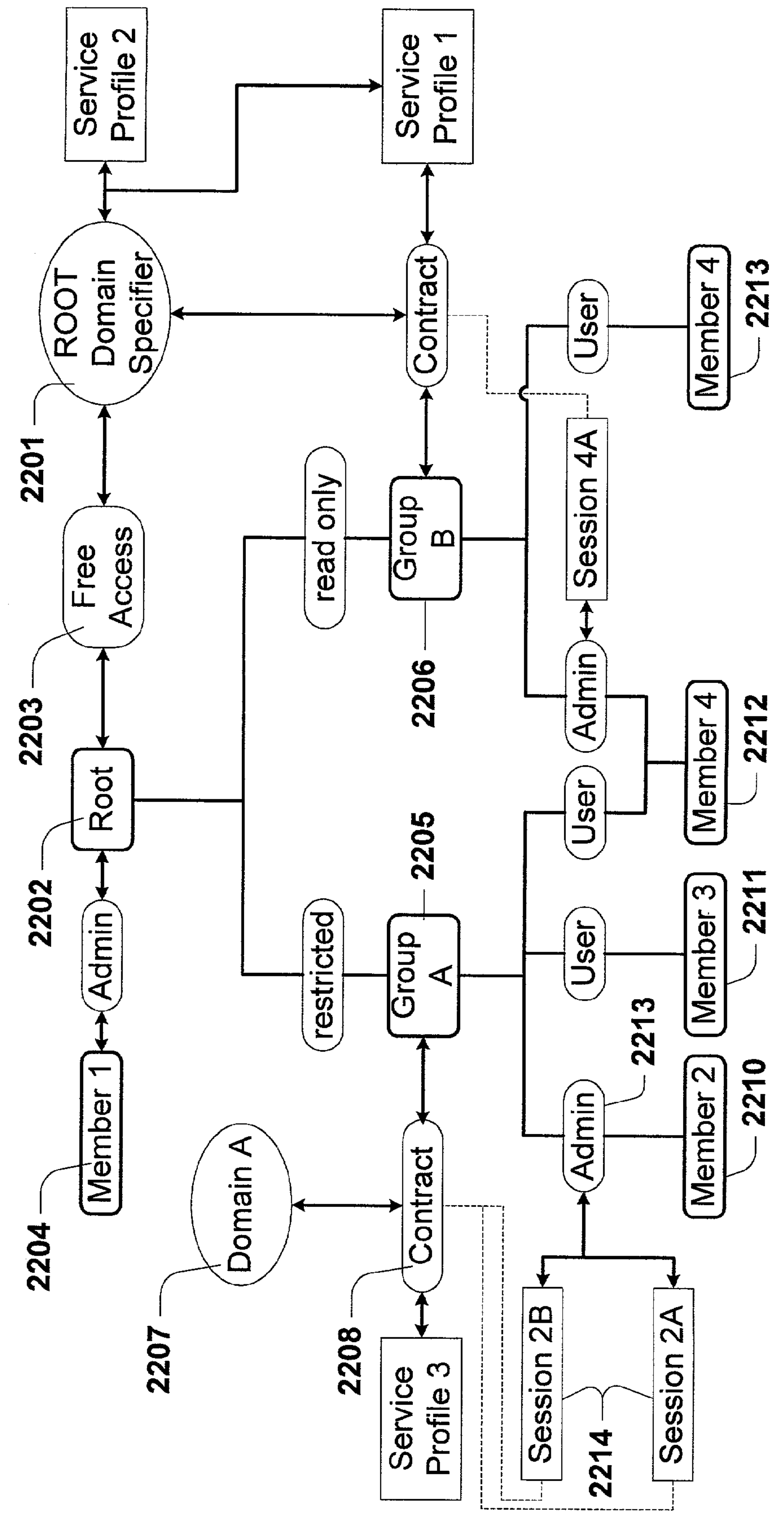
FIG. 22 is an illustrative example of a possible domain relationship model that could be realized by the preferred embodiment via the domain and membership extensions.

Consider the illustrative object instance diagram shown in FIG. 22. A domain hierarchy is defined such that members are assigned to various groups with different services. The hierarchy begins with the root group 2202, which belongs to the ROOT Domain 2201 as provided by the free access service contract relationship 2203. For this scenario, a free access service contract means that no restrictions are applied to accessing services provided in the root group. This is useful, for example, where administrators such as Member 1 2204 needs access to all services in the root domain for configuration management. In general, only members with administrator type roles would belong to a root domain, as they have complete access to all sub-domains and service profiles within a system of TPFs. Continuing with the illustration, two groups 2205 and 2206 belong to the root group 2202. Group 2205 has restricted access to the root group in that no members belonging to Group 2205 may access information belonging to the root. To facilitate the enforcement of this restriction, Group 2205 is associated with a custom Domain 2207, which has a completely independent set of service profile specifications. In this case, Group 2205 has service access restrictions as specified in the service contract 2208. Restrictions can include reporting requirements, maximum utilization, concurrency, etc. Group 2205 has three associated members: 2210, 2211, and 2212. Member 2210 has an admin type role 2213 with group 2205, providing for administrative capabilities, such as adding and removing members. As shown, Member 2210 has two active sessions 2214, which provide TPF transaction support according to the service profile as defined by contract 2208. Group 2206 is defined with read-only access with respect to the root group 2202 in that sessions created within the scope of 2206 are able to view service and member information of the root group 2202 but cannot modify it. This is useful for situations where the TPF is providing global services. Group 2206 has two members 2212 and 2213, where 2212 belongs to both groups 2205 and 2206. Member 2212 has a different role for each group 2205 and 2206, which means he has different access rights to the services included in each of those groups.

With the domain extensions, the TPF has the means to organize transaction state data according to the following levels of scope: session, member, group, and domain. In addition, the TPF provides for organizing state data hierarchically with the group scope. Domain specialization also provides an intrinsic service management model that is flexible enough to meet almost any particular configuration scheme, with the provisions of a built in secured access model that is standardized with respect to all services and transactions.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A networked computer system having a plurality of computer servers for providing a resultant resource according to a transaction request, the networked computer system comprising:

a resource transaction processing module;

a plurality of resource providers, each resource provider being remotely located to the resource transaction processing module and communicatively coupled to the resource transaction processing module via a computer network, and wherein each resource provider provides a resource available for use by the resource transaction processing module; and a resource information registry communicatively coupled to the resource transaction processing module for storing information about the resources provided by the plurality of resource providers, and wherein resource information for each of the resources available for use by the resource transaction processing module is stored the resource information registry;

wherein, in response to receiving a transaction request, the resource transaction processing module:

constructs a transaction situation context by creating context elements specified by a transaction definition program that provides additional information to the resource transaction processing module for dynamically selecting and processing at least one resource;

wherein dynamically selects at least one resource to process, in conjunction with the transaction situation context, in order to satisfy the transaction request according to resource information stored in the resource information registry;

determines one or more discrete operations to perform on the at least one selected resource to satisfy the transaction request;

obtains the at least one selected resource from the resource provider providing that resource; and processes the at least one selected resource according to the one or more discrete operations to generate a resultant resource.

2. The system of claim 1, wherein the resource transaction processing module also stores resource information corresponding to the resultant resource in the resource information registry.

3. The system of claim 2 further comprising a resource storage coupled to the resource transaction processing module for storing a plurality of resultant resources generated by the resource transaction processing module.

4. The system of claim 3, wherein the resource transaction processing module selects a resultant resource from the resource storage cache for generating a new resultant resource according to the transaction request and resource information stored in the resource information registry.

5. The system of claim 1, wherein the resource information about a plurality of resources stored in the resource information registry includes at least one resource classification for each of the plurality of resources.

6. The system of claim 5, wherein the resource transaction processing module selects the at least one resource for processing according to the transaction request and the at least one resource classification of each of the plurality of resources stored in the resource information registry.

7. The system of claim 1 further comprising a plurality of resource transaction processing modules.

8. The system of claim 7, wherein the plurality of resource transaction processing modules cooperate to process the one or more discrete operations.

9. The system of claim 8, wherein the plurality of resource transaction processing modules cooperate simultaneously to process the one or more discrete operations.

10. The system of claim 8, wherein the plurality of resource transaction processing modules cooperatively process the one or more discrete operations according to the accessibility of a resource to each resource transaction processing module.

11. The system of claim 8, wherein the plurality of resource transaction processing modules cooperatively process the one or more discrete operations according to the processing capabilities of each resource transaction processing module.

12. The system of claim 8, wherein the plurality of resource transaction processing modules cooperatively process the one or more discrete operations according to a minimal completion time of the transaction request.

13. The system of claim 1, wherein the transaction request is a synchronous transaction request.

14. The system of claim 1, wherein the transaction request is an asynchronous transaction request.

15. A networked computer system comprising a plurality of computing devices for requesting an output resource from a resource transaction processing module, the networked computer system comprising:

a resource registry storing attributes of a plurality of input resources available from a plurality of independent resource providers;

a transaction request entry module, communicatively coupled to the resource registry, for creating a transaction request in human readable form, the transaction request identifying an output resource to be generated from at least one input resource according to the resource attributes of the plurality of input resources store in the resource registry, and specifying operations to be performed by a resource transaction processing module on the at least one input resource;

a transaction situation context module that constructs a transaction situation context that provides contextual information for dynamically selecting and processing at least one input resource;

a resource transaction processing module for dynamically selecting at least one input resource suitable for processing by the resource transaction processing module in order to satisfy the transaction request, wherein the at least one resource is dynamically selected in accordance with a transaction situation context for providing information for dynamically selecting the at least one resource, and obtaining the at least one input resource and generating an output resource from the at least one selected input resource; and a transaction processing agent coupled to the resource transaction processing module that translates the transaction request from human readable form, determines a plurality of corresponding instructions to generate the output resource from the at least one selected input resource, and returns the corresponding instructions to the resource transaction processing module in a form executable by the resource transaction processing module;

wherein the resource transaction processing module generates the output resource from the at least one selected input resource by executing the instructions returned from the transaction processing agent.

16. The system of claim 15, wherein the transaction processing agent further stores the corresponding operation sequences of the transaction request in a transaction request cache for subsequent access.

17. A computer-implemented method for generating an output resource according to a transaction request, the method comprising each of the following carried out by a resource transaction processing module executing on a computer:

obtaining a transaction request identifying an output resource to be generated;

constructing a transaction situation context providing contextual information corresponding to the client for dynamically selecting one or more resources to satisfy the transaction request;

analyzing the transaction request in accordance with the transaction context, and based on the analysis:

dynamically creating a set of one or more input resources from a plurality of resources, wherein the resources are obtainable from a plurality of independent resource providers;

determining one or more operations to be performed on the one or more selected input resources necessary to generate the output resource; and obtaining the one or more selected input resources from the independent resource providers; and executing the one or more identified operations on the one or more selected input resources to generate the output resource.

18. The method of claim 17, wherein executing the one or more identified operations on the one or more selected input resources generates a resultant resource.

19. The method of claim 18, wherein the resultant resource is selected as an input resource to generate the output resource.

20. The method of claim 19, wherein each of the plurality of input resources is associated with at least one resource classification, and wherein selecting one or more input resources from a plurality of resources includes selecting one or more input resources according to an associated resource classification.

21. The method of claim 20, wherein a resultant resource is stored in a resource cache for subsequent use, the resource cache sized to store a plurality of resultant resources.

22. The method of claim 21, wherein information associated with the resultant resource is stored in a resource registry, the resource registry sized to store information corresponding to a plurality of resources.

23. The method of claim 22, wherein selecting one or more input resources from a plurality of resources includes selecting one or more resultant resources according to information in the resource registry.

24. The method of claim 17 further comprising distributing the execution of the one or more operations to be performed on the one or more input resources among a plurality of transaction processing modules.

25. The method of claim 24, wherein the plurality of transaction processing modules operate simultaneously.

26. The method of claim 24, wherein distributing the execution of the one or more operations to be performed on the one or more input resources among a plurality of transaction processing modules includes distributing the one or more operations to be performed according to the accessibility of each input resource to each transaction processing module.

27. The method of claim 24, wherein distributing the execution of the one or more operations to be performed on the one or more input resources among a plurality of transaction processing modules includes distributing the one or more operations to be performed according to the processing capabilities of each transaction processing module.

28. The method of claim 24, wherein distributing the execution of the one or more operations to be performed on the one or more input resources among a plurality of transaction processing modules includes distributing the one or more operations to be performed according to a minimal completion time of the transaction request.

29. The method of claim 17, wherein the contextual information corresponding to a client includes language information.

30. The method of claim 17, wherein the contextual information corresponding to a client further includes time-sensitive information.

31. The method of claim 17, wherein the contextual information corresponding to a client further includes location information.

32. The method of claim 17, wherein the contextual information corresponding to a client further includes information corresponding to previous transaction requests.

33. The method of claim 17, wherein an input resource is selectable only if the client is authorized to select the input resource according to a resource access control list.

34. The method of claim 17, wherein an input resource is selectable only if the client is a member of a domain authorized to access the input resource.

35. The method of claim 17, wherein the transaction request from a client is a synchronous transaction request.

36. The method of claim 17, wherein the transaction request from a client is an asynchronous transaction request.

37. A computer-implemented method for selecting and processing one or more input resources to generate an output resource according to a transaction request, the method comprising each of the following as performed by a resource transaction processing module executing on a computer:

identifying one or more resource characteristics necessary to generate the output resource identified by the transaction request;

creating a transaction situation context corresponding to the transaction request, the transaction context providing contextual information for dynamically selecting input resources;

dynamically selecting one or more input resources having the identified resource characteristic according to information in a resource registry and further according to the transaction situation context, wherein said resource registry stores resource characteristics associated with a plurality of input resources available from a plurality of independent resource providers remotely located to the resource transaction processing module;

determining a plurality of discrete operations to be performed by the resource transaction processing module on the one or more selected input resources to generate the output resource;

obtaining the one or more selected input resources from the independent resource providers; and processing the plurality of discrete operations on the one or more selected input resources to generate the output resource.

38. The method of claim 37 wherein processing the one or more selected input resources according to the transaction request to generate the output resource further includes utilizing a plurality of resource transaction processing modules in a networked environment to process the transaction request.

39. The method of claim 38 wherein the plurality of resource transaction processing modules utilized to process the transaction request are operable to utilize sequential or parallel processing strategies, or both.

40. The method recited in claim 37, wherein the resource transaction processing module is stored in a computer-readable medium and executed by the computer.

41. A networked computer system comprising a plurality of computing devices for providing a resultant resource according to a transaction request, the networked computer system comprising:

a plurality of resource transaction processing modules configured to cooperatively process one or more discrete operations according to a minimal completion time of the transaction request;

a plurality of resource providers, each resource provider being remotely located to the resource transaction processing module and communicatively coupled to the resource transaction processing module via a computer network, and wherein each resource provider provides a resource available for use by the resource transaction processing module; and a resource information registry communicatively coupled to the resource transaction processing module for storing information about the resources provided by the plurality of resource providers, and wherein resource information for each of the resources available for use by the resource transaction processing module is stored in the resource information registry;

wherein, in response to receiving a transaction request, the plurality of resource transaction processing modules cooperatively:

select at least one resource to process in order to satisfy the transaction request according to resource information stored in the resource information registry;

determine one or more discrete operations to perform on the at least one selected resource to satisfy the transaction request;

obtain the at least one selected resource from the resource provider providing that resource; and process the at least one selected resource according to the one or more discrete operations to generate a resultant resource.

42. A computer-implemented method for generating an output resource according to a transaction request, the method comprising each of the following carried out by a plurality of resource transaction processing modules cooperatively executing on one or more computing devices, the method comprising:

obtaining a transaction request identifying an output resource to be generated;

analyzing the transaction request, and based on the analysis:

selecting one or more input resources from a plurality of resources, wherein the resources are obtainable from a plurality of independent resource providers;

determining one or more operations to be performed on the one or more selected input resources necessary to generate the output resource; and obtaining the one or more selected input resources from the independent resource providers;

distributing the one or more operations to be performed on the one or more selected input resources among the plurality of resource transaction processing modules to satisfy a minimal completion time of the transaction request; and cooperatively executing the one or more identified operations on the one or more selected input resources to generate the output resource.

* * * * *